(12) United States Patent
Robinson et al.

(10) Patent No.: US 10,705,574 B2
(45) Date of Patent: Jul. 7, 2020

(54) ACCESSORY DEVICES FOR PORTABLE ELECTRONIC DEVICES

(71) Applicant: Apple Inc., Cupertino, CA (US)

(72) Inventors: Kevin M. Robinson, Sunnyvale, CA (US); James A. Stryker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/290,655

(22) Filed: Mar. 1, 2019

(65) Prior Publication Data

US 2020/0097050 A1 Mar. 26, 2020

Related U.S. Application Data

(60) Provisional application No. 62/735,442, filed on Sep. 24, 2018.

(51) Int. Cl.
*G06F 1/16* (2006.01)

(52) U.S. Cl.
CPC ............ *G06F 1/1681* (2013.01); *G06F 1/166* (2013.01); *G06F 1/1632* (2013.01); *G06F 1/1654* (2013.01); *G06F 1/1669* (2013.01); *G06F 1/1626* (2013.01)

(58) Field of Classification Search
CPC ..... G06F 1/1632; G06F 1/1654; G06F 1/1681
See application file for complete search history.

(56) References Cited

U.S. PATENT DOCUMENTS

| 1,830,308 | A | * | 11/1931 | Zepke | A47F 5/08 248/277.1 |
| 5,383,138 | A | * | 1/1995 | Motoyama | E05C 1/16 361/679.27 |
| 6,104,604 | A | * | 8/2000 | Anderson | G06F 1/1616 361/679.08 |
| 6,430,038 | B1 | * | 8/2002 | Helot | G06F 1/1616 248/917 |
| 6,654,234 | B2 | * | 11/2003 | Landry | G06F 1/1616 248/917 |
| 6,788,530 | B2 | * | 9/2004 | Hill | G06F 1/1601 248/923 |
| 6,798,649 | B1 | | 9/2004 | Olodort et al. | |

(Continued)

FOREIGN PATENT DOCUMENTS

GB 2558679 A 7/2018

*Primary Examiner* — Adrian S Wilson
(74) *Attorney, Agent, or Firm* — Dickinson Wright RLLP

(57) ABSTRACT

An accessory device for an electronic device is disclosed. The accessory device may include one or more bodies, or segments, that are rotationally coupled to each other. One segment may include a keyboard used to provide an input or command to the electronic device. The accessory device may include an additional segment with a hinge assembly and a panel coupled to the hinge assembly. The panel is designed to receive and couple with the electronic device. The hinge assembly is designed to move the panel into different positions. For instance, the hinge assembly and the panel can be stored with a segment of the accessory device when not in use. The hinge assembly can subsequently deploy, and place the panel in a position to receive the electronic device such that the electronic device is positioned for use with the keyboard.

20 Claims, 15 Drawing Sheets

(56) References Cited

U.S. PATENT DOCUMENTS

| | | | | |
|---|---|---|---|---|
| 6,816,365 B2* | 11/2004 | Hill | | G06F 1/1616 341/22 |
| 6,905,101 B1* | 6/2005 | Dittmer | | F16M 11/10 248/125.7 |
| 7,091,961 B2* | 8/2006 | Ditzik | | G06F 1/16 248/923 |
| 7,398,950 B2* | 7/2008 | Hung | | F16M 11/10 248/276.1 |
| 7,546,745 B2* | 6/2009 | Lee | | F16M 11/10 248/276.1 |
| 7,648,112 B2* | 1/2010 | Wu | | F16M 11/045 248/282.1 |
| 7,656,652 B2* | 2/2010 | Moser | | G06F 1/1616 206/457 |
| 7,967,404 B2* | 6/2011 | Oh | | F16M 11/04 312/282 |
| 8,094,438 B2* | 1/2012 | Dittmer | | F16M 11/10 361/679.01 |
| 8,310,823 B2* | 11/2012 | Stoltz | | G06F 1/1616 361/679.08 |
| D672,356 S * | 12/2012 | Quijano | | D14/447 |
| D718,772 S * | 12/2014 | Westrup | | D14/447 |
| 8,917,499 B1 | 12/2014 | Read | | |
| D732,543 S * | 6/2015 | Westrup | | D14/447 |
| 9,287,917 B1* | 3/2016 | Tages | | H04B 1/3888 |
| 9,654,165 B2* | 5/2017 | Cho | | H04B 1/3888 |
| 9,729,685 B2* | 8/2017 | Ive | | G06F 1/1677 |
| 10,345,916 B2* | 7/2019 | Gu | | G06F 3/0202 |
| 2004/0195305 A1 | 10/2004 | Dotson | | |
| 2006/0108483 A1* | 5/2006 | Wolff | | F16M 11/10 248/122.1 |
| 2006/0125360 A1* | 6/2006 | Kim | | F16M 11/08 312/405.1 |
| 2007/0164646 A1* | 7/2007 | Raab | | F16M 11/08 312/405.1 |
| 2011/0096513 A1* | 4/2011 | Kim | | G06F 1/1626 361/747 |
| 2012/0170194 A1* | 7/2012 | Lord | | G06F 1/1616 361/679.02 |
| 2013/0094134 A1* | 4/2013 | Ashcraft | | G06F 1/1615 361/679.29 |
| 2013/0279141 A1* | 10/2013 | Chen | | H05K 7/14 361/809 |
| 2013/0299326 A1* | 11/2013 | Hsu | | H01H 13/76 200/5 A |
| 2013/0335915 A1* | 12/2013 | Lai | | H01R 13/44 361/679.44 |
| 2014/0055920 A1* | 2/2014 | Liang | | G06F 1/1616 361/679.01 |
| 2014/0104761 A1* | 4/2014 | Hsu | | H05K 7/1401 361/679.01 |
| 2014/0133080 A1* | 5/2014 | Hwang | | G06F 1/1632 361/679.17 |
| 2014/0211393 A1* | 7/2014 | Lee | | G06F 1/1626 361/679.12 |
| 2014/0246354 A1* | 9/2014 | Probst | | G06F 1/1616 206/756 |
| 2014/0285962 A1* | 9/2014 | Staats | | G06F 1/1632 361/679.43 |

* cited by examiner

ACCESSORY DEVICES FOR PORTABLE ELECTRONIC DEVICES

CROSS-REFERENCE TO RELATED APPLICATION(S)

This application claims the benefit of priority to U.S. Provisional Application No. 62/735,442, filed on Sep. 24, 2018, titled "ACCESSORY DEVICES FOR PORTABLE ELECTRONIC DEVICES," the disclosure of which is incorporated herein by reference in their entirety.

FIELD

The following description relates to accessory devices. In particular, the following description relates to accessory devices for portable electronic devices. Accessory devices include a panel and a hinge assembly that allows the panel to move relative to remaining structural components of the accessory device. The panel can be stored in an opening of the accessory device, or deployed (using the hinge assembly) and removed from the opening to provide a receiving surface for a portable electronic device.

BACKGROUND

Accessory devices can be used with electronic devices. An accessory device may include mechanical features used to hold an electronic device.

SUMMARY

In one aspect, an accessory device for a portable electronic device is described. The accessory device may include a segment that includes an opening that leads to an internal volume. The accessory device may further include a panel capable of receiving the portable electronic device. The accessory device may further include a hinge assembly carried by the segment and coupled with the panel. In some instances, a first configuration includes the hinge assembly positioned in the internal volume and the panel positioned in the opening and covering the hinge assembly. Also, in some instances, a second configuration includes the hinge assembly positioned at least partially out of the internal volume and the panel out of the opening.

In another aspect, an accessory device for a portable electronic device is described. The accessory device may include a first segment that includes a keyboard capable of communicating with the portable electronic device. The accessory device may further include a second segment coupled with the first segment. The accessory device may further include a panel that defines a receiving surface for the portable electronic device. The accessory device may further include a hinge assembly secured with the second segment and the panel. The hinge assembly may include a first hinge component. The hinge assembly may further include a second hinge component coupled to the first hinge component. The first hinge component and the second hinge component may be configured to rotate about a pivot point. In some instances, a rotation about the pivot point includes i) the first hinge component rotating along a surface, and ii) the second hinge component rotating away from the surface and positioning the panel to receive the portable electronic device at the receiving surface.

In another aspect, an accessory device for a portable electronic device is described. The accessory device may include a segment comprising an opening that leads to an internal volume. The accessory device may further include a panel. The accessory device may further include a hinge assembly that rotationally couples the panel with the segment. The accessory device is capable of different configuration. For example, in some instances, the accessory device defines a stored configuration. In the stored configuration, the panel is positioned in the opening and the hinge assembly is positioned in the segment and covered by the panel. In some instances, the accessory device defines a deployed configuration. In the deployed configuration, the hinge assembly is at least partially out of the segment and positions the panel such that the panel is capable of receiving the portable electronic device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
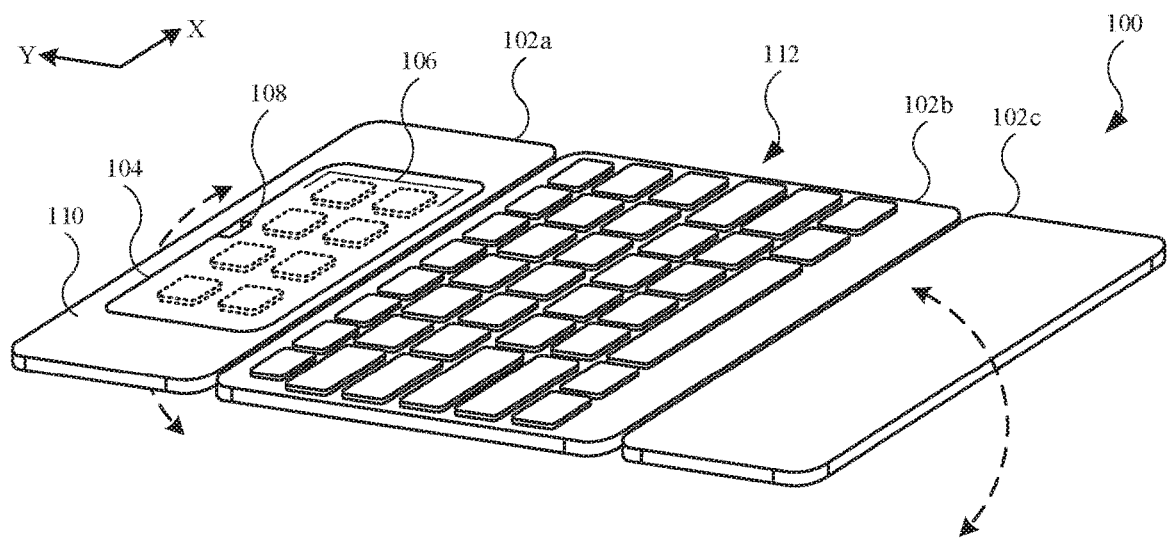
FIG. 1 illustrates an isometric view of an embodiment of an accessory device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessories devices suitable for use with portable electronic devices, such as mobile wireless communication devices (smartphones) and tablet computer devices. Accessory devices described herein may include a hinge assembly and a panel coupled to the hinge assembly. The hinge assembly can be rotationally driven by the hinge assembly to drive the panel away from other structural components of the accessory device. The panel can subsequently provide a receiving surface for an electronic device. The panel may include magnets that magnetically couple with magnets in the electronic device. In this regard, the accessory device does not require mechanical devices (such as sidewalls that constrain the electronic device) or other interlocking devices, as the magnetic attraction between the magnets provides a sufficient coupling force. When the electronic device is no longer in use, the hinge assembly and the panel can be stored in the accessory device.

Traditional hinge assemblies rely upon engagement between a shaft and a clip in frictional engagement with the shaft. The shaft is rotationally driven with respect to the clip (or vice versa), and when the rotation ceases the shaft remains in the same location due to the frictional engagement. However, one drawback of the shaft-clip hinge assembly is that the amount of friction available is dependent upon the diameter of the shaft. In this regard, when the shaft-clip hinge assembly is required to hold a larger electronic device, such as a tablet computer device, the amount of frictional force must increases. This typically requires an increase in shaft diameter to increase the surface area of the shaft, as the frictional force is a function of shaft size. It is generally not desirable to increase the size of these components, particularly when the hinge assembly is located within the accessory device, as space for storing these components is limited.

Hinge assemblies described herein overcome these challenges by substituting shafts and friction clips with other components. For instance, a hinge assembly described herein may include a first hinge component coupled to a second hinge component by a joint. The first and second hinge components may include generally flat components, as compared to the circular friction clips and shafts. The first and second hinge components allow the hinge assembly to transition from a stored configuration to a deployed configuration, and vice versa. In the stored configuration, the first and second hinge components lie flat, i.e., the first and second hinge components are generally in line with a horizontal plane. Further, in the stored configuration, both the first and second hinge components are positioned in the accessory device. Also, in the stored configuration, the panel is positioned in an opening of the accessory device, and generally covers the first and second hinge components. In the deployed configuration, the panel is removed from the opening and supported by the hinge assembly, and in particular, the second hinge component. The panel magnets can magnetically couple with the electronic device magnets and the electronic device is in an upright position.

When transitioning from the stored configuration to the deployed configuration, the first hinge component rotates about a pivot point, but remains generally flat. However, the rotation of the first hinge component causes the second hinge component to move out of the flat configuration, and lifts the second hinge component into a support configuration for the panel. The second hinge component may rotate about the same pivot point as the first hinge component. Additionally, the second hinge component may rotate about an axis of rotation. The axis of rotation may lie in a plane defined by the first hinge component. The hinge assembly may include a third and fourth hinge component with features similar to those of the first and second hinge components, respectively. In the deployed configuration, the weight of the electronic device is supported by the second and fourth hinge components, which are supported by the first and third hinge components, respectively.

In some instances, the second and fourth hinge components are secured to the panel. However, in some embodiments, hinge assembly further a central component coupled to the panel, as well as the second and fourth hinge components. Accordingly, the central component moves in conjunction with these coupled components.

Hinge assemblies described offer several advantages over traditional hinge assemblies. For instance, hinge assemblies described herein do not rely upon a shaft and associated size (diameter) for frictional support, as the frictional engagement does not occur between a shaft and another elements. Rather, hinge assemblies described herein provide stability in that frictional forces lie outside the components (such as the panel that directly supports the electronic device), and are less dependent upon the size and shape of the hinge components. Also, the configuration of the hinge assemblies described herein change significantly between the stored and deployed configuration. This allows the hinge assembly to lie flat in the accessory device and hidden from view (in the stored configuration), and subsequently transition to a three-dimensional support structure to receive support the electronic device (in the deployed configuration).

These and other embodiments are discussed below with reference to FIGS. 1-28. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with some described embodiments. The accessory device 100 is designed for use with portable electronic devices (not shown in FIG. 1), such as mobile wireless communication devices (smartphones) and tablet computer devices. In this regard, the accessory device 100 may be referred to as a case, a cover, a protective case, a protective cover, a folding cover, or the like. As shown, the accessory device 100 includes a segment 102a, a segment 102b, and a segment 102c, with the segment 102c being an optional segment. As indicated by the arrows, the segment 102a and the segment 102c are rotatable with respect to the segment 102b. For example, the segment 102a and the segment 102b may fold over a front surface or a back surface (not shown in FIG. 1) of the segment 102b, with the back surface being opposite the front surface. This allows the accessory device 100 to reduce its overall profile in the X-Y plane, as shown in FIG. 1. Also, the segment 102a, the segment 102b, and the segment 102c may combine to define a size and shape of the portable electronic device. In some embodiments, when the segment 102c is not present, the segment 102a may combine with the segment 102b to define a size and shape of the portable electronic device.

The accessory device 100 may further include a panel 104 designed to extend from the segment 102a and receive a portable electronic device. In this regard, the accessory device may include a hinge assembly coupled to the panel 104. This will be shown later. When stored, the hinge assembly is hidden in the segment 102a and covered by the panel 104. In order to retain the portable electronic device, the panel 104 may include magnets 106 (shown as dotted lines) that magnetically couple with magnets in the portable electronic device. As shown, the panel 104 is stored in the segment 102a and is co-planar, or flush, with respect to a surface 110 of the segment 102a. In order to lift and remove the panel 104 from the segment 102a, the panel 104 may include a recess 108 that allows a user to engage and move the panel 104. Accordingly, the panel 104 may move by manual means.

The segment 102b may include a keyboard 112 designed to provide inputs or commands to the portable electronic device. In this regard, the keyboard 112 may be in communication with the portable electronic device through electrical contacts (not shown in FIG. 1) on the panel 104 that are in contact with electrical contacts (not shown in FIG. 1) of the portable electronic device, and/or by wireless communication (such as Bluetooth® communication, as a non-limiting example). The keyboard 112 may be configured in accordance a QWERTY configuration. In some embodiments, the panel 104 is driven by a motor (not shown in FIG. 1). The command to initiate movement of the panel 104 may be provided through depressing a key of the keyboard 112, or by depressing a button that can be located on any one of the aforementioned segments.

Although not shown, the segment 102c may include an additional input device (or devices). For example, the segment 102c may include a touch pad and/or a display that provide a dynamic row of input keys that changes in accordance with a software application running on a display (not shown in FIG. 1) of the portable electronic device.

Figure 2:
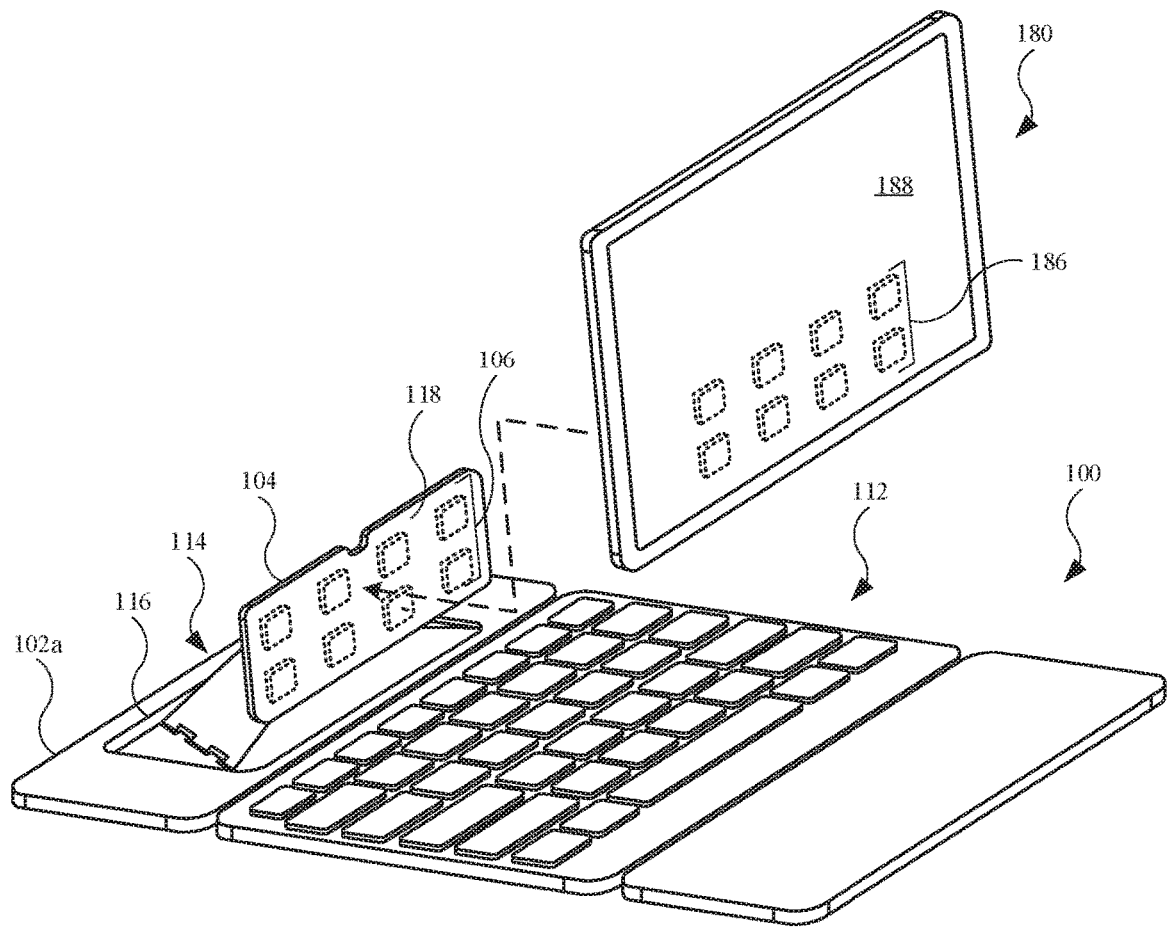
FIG. 2 illustrates an isometric view of the accessory device shown in FIG. 1, showing the panel extended away from the segment.

FIG. 2 illustrates an isometric view of the accessory device 100 shown in FIG. 1, showing the panel 104 extended away from the segment 102a. As shown, the accessory device 100 includes a hinge assembly 114 designed to move the panel 104 from a stored configuration (shown in FIG. 1) to a deployed configuration (shown in FIG. 2) to receive a portable electronic device 180, and position the portable electronic device 180 in a user-friendly configuration. In the deployed configuration, the hinge assembly 114 extends from an internal volume within the segment 102a. Also, in the deployed configuration, the panel 104 is moved out of an opening 116 (that leads to the internal volume) and provides a receiving surface 118 for the portable electronic device 180. Further, in order to hold/suspend the portable electronic device 180, magnets 106 in the panel 104 magnetically couple with magnets 186 in the portable electronic device 180. Accordingly, when the magnets 106 magnetically couple with the magnets 186, the portable electronic device 180 is held against the receiving surface 118 of the panel 104. Further, the portable electronic device 180 is positioned such that a display 188 is aligned with the keyboard 112, and the display 188 and the keyboard 112 are in a desired position for a user.

Referring again to the magnets 106 in the accessory device 100, when the segment 102a is formed from a magnetically attractable material (such as a ferromagnetic material) or includes a magnet (not shown in FIGS. 1 and 2), the magnets 106, being secured with the panel 104, are capable of magnetically coupling the panel to the segment 102a. The resulting magnetic attraction force is used to retain the panel 104 in the segment 102a, as shown in FIG. 1. This provide a flush, or co-planar, relationship between the panel 104 and a surface of the segment 102a.

Figure 3:
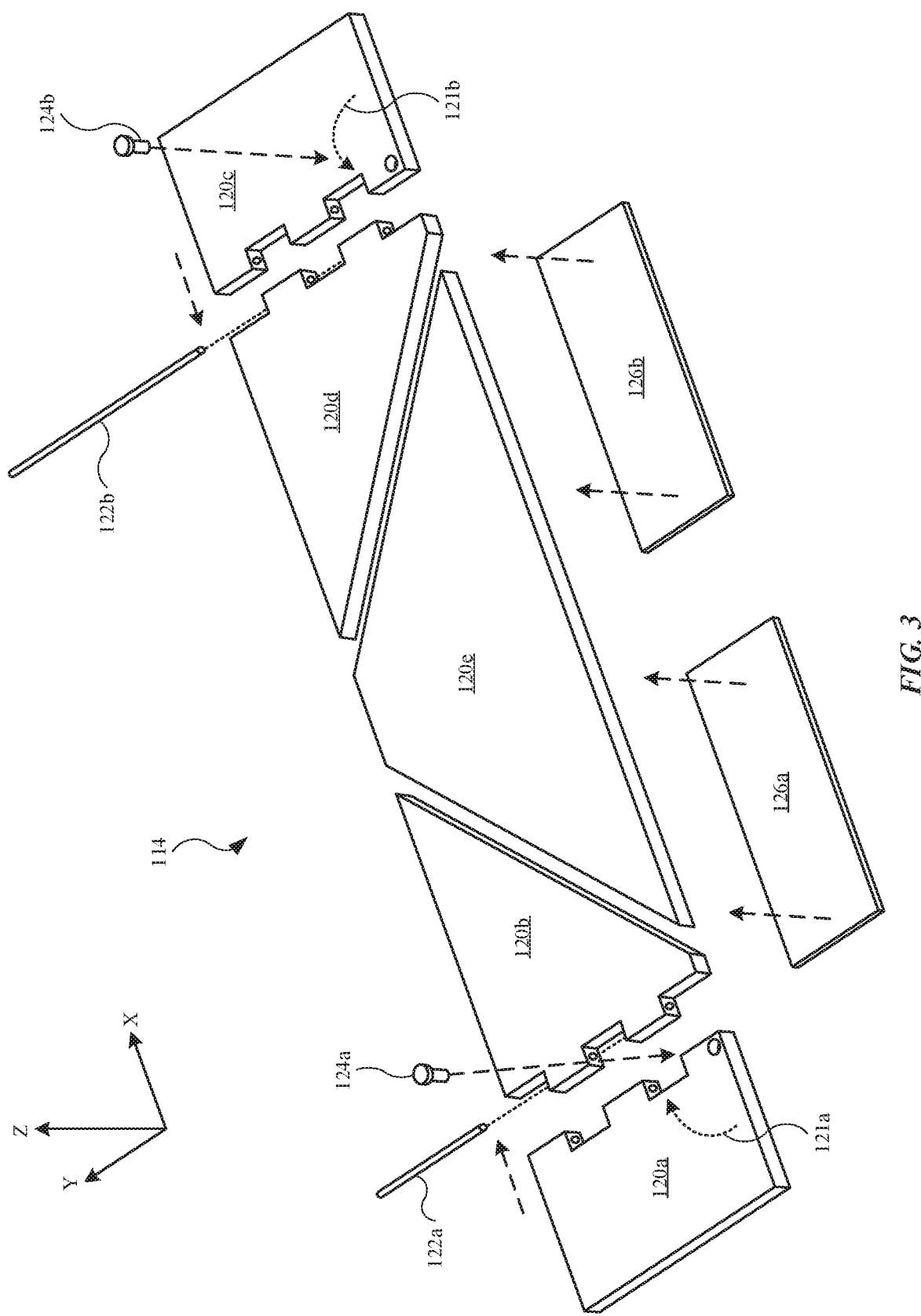
FIG. 3 illustrates an exploded view of the hinge assembly of the accessory device shown in FIGS. 1 and 2, showing the components of the hinge assembly.

FIG. 3 illustrates an exploded view of the hinge assembly 114 of the accessory device 100 shown in FIGS. 1 and 2, showing the components of the hinge assembly 114. As shown, the hinge assembly 114 may include multiple (segmented) hinge components that can be joined together. For example, the hinge assembly 114 may include a hinge component 120a that couples with a hinge component 120b by a shaft 122a that passes through the hinge component 120a and the hinge component 120b. The shaft 122a allows for relative movement between through the hinge component 120a and the hinge component 120b. In this regard, the connection between the hinge component 120a and the hinge component 120b defines a joint. In order to secure the hinge component 120a and the hinge component 120b to a segment (such as the segment 102a, shown in FIG. 1), a fastener 124a may extend through an opening of the hinge component 120a.

The hinge assembly 114 may further include a hinge component 120c that couples with a hinge component 120d by a shaft 122b that passes through the hinge component 120c and the hinge component 120d. The shaft 122b allows for relative movement between through the hinge component 120c and the hinge component 120d. In this regard, the connection between the hinge component 120c and the hinge component 120d defines a joint. In order to secure the hinge component 120c and the hinge component 120d to a segment (such as the segment 102a, shown in FIG. 1), a fastener 124b may extend through an opening of the hinge component 120c.

The hinge assembly 114 may further include a hinge component 120e. The hinge component 120e may be referred to as a central component, central hinge component, or a platform, as non-limiting examples. The hinge component 120e is designed to receive a panel (such as the panel 104, shown in FIGS. 1 and 2). The hinge component 120e may couple with the hinge component 120b and the hinge component 120d by a flexible member 126a and a flexible member 126b, respectively. The flexible member 126a and the flexible member 126b include one or more flexible materials. Also, the flexible member 126a may adhesively secure with the hinge component 120b and the hinge component 120e, and create a joint that allows movement between the hinge component 120b and the hinge component 120e. The flexible member 126b may adhesively secure with the hinge component 120d and the hinge component 120e, and create a joint that allows movement between the hinge component 120d and the hinge component 120e. It should be noted that the flexible member 126a may not be required if the hinge component 120b is secured with the hinge component 120e in a manner that allows relative rotational movement between the hinge component 120b and the hinge component 120e. Similarly, the flexible member 126b may not be required if the hinge component 120d is secured with the hinge component 120e in a manner that allows relative rotational movement between the hinge component 120e and the hinge component 120e. For example, although now shown, additional shafts (similar to the shaft 122a and the shaft 122b) may be integrated into the hinge assembly 114 to replace the aforementioned flexible members.

The hinge components are designed to position a panel in either a stored or a deployed configuration. In the stored configuration, the hinge components generally lie flat along a plane defined by the X-Y plane. When transitioning from the stored to the deployed configuration, the components can move simultaneously. However, the hinge components may move in different directions. For example, when the hinge component 120a is rotated in a clockwise direction 121a, the hinge component 120a remains in the plane and the hinge component 120b is rotated out of the plane (defined by the X-Y plane) such that the position of the hinge component 120b includes a three-dimension position in the X-, Y-, and Z-axes. Further, the hinge component 120a and the hinge component 120b are designed to rotate about the fastener 124a. In this regard, the fastener 124a may define a common pivot axis, or common pivot point, for the hinge component 120a and the hinge component 120b. During the described movement of the hinge component 120a and the hinge component 120b, the hinge component 120c and the hinge component 120d are also designed to move. For example, when the hinge component 120c is rotated in a counter-clockwise direction 121b, the hinge component 120c remains in the plane and the hinge component 120d is rotated out of the plane (defined by the X-Y plane) such that the position of the hinge component 120d includes a three-dimension position in the X-, Y-, and Z-axes, similar to the hinge component 120b. Further, the hinge component 120c and the hinge component 120d are designed to rotate about the fastener 124b. In this regard, the fastener 124b may define a common pivot axis, or common pivot point, for the hinge component 120c and the hinge component 120d. Also, the hinge component 120b and the hinge component 120d can combine to move the hinge component 120e.

Figure 4:
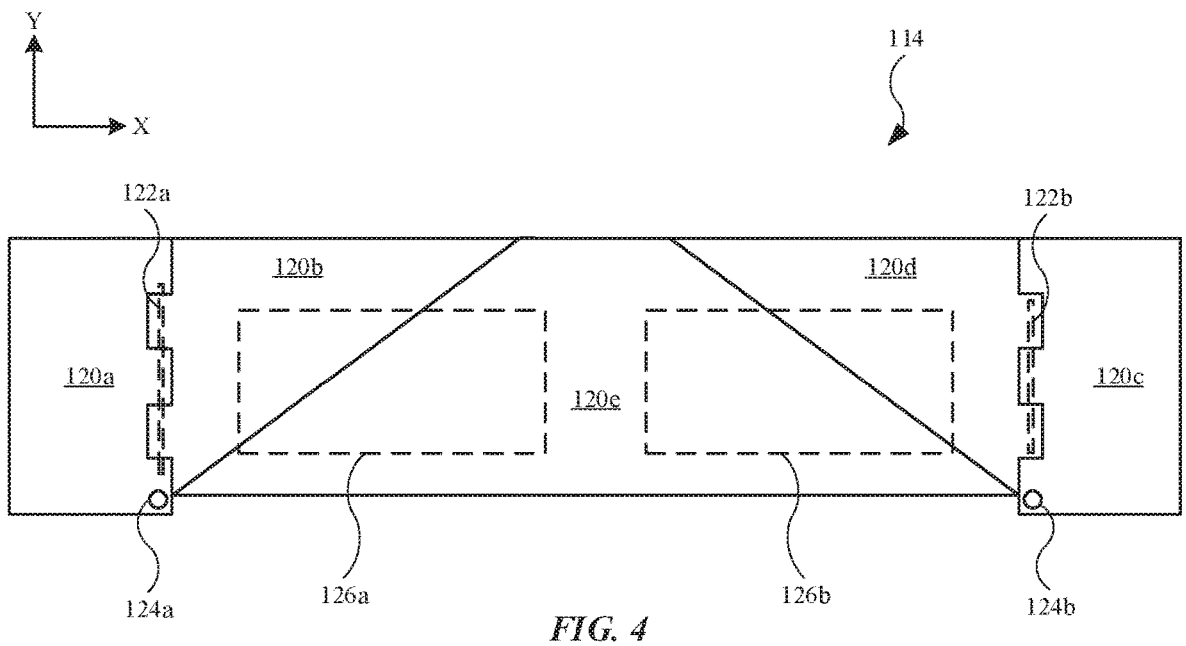
FIG. 4 illustrates a plan view of the hinge assembly, showing the components assembled together.

FIG. 4 illustrates a plan view of the hinge assembly 114, showing the components assembled together. As shown, the hinge assembly 114 can lie flat in a plane (or planar surface) defined by the X-Y plane when the hinge assembly 114 is assembled. The fastener 124a passes through an opening of the hinge component 120a to secure with a segment (not shown in FIG. 4), and the fastener 124b passes through an opening of the hinge component 120c to secure with a segment (not shown in FIG. 4). Also, the flexible member 126a secures with the hinge component 120b and the hinge component 120e, and the flexible member 126b secures with the hinge component 120d and the hinge component 120e.

As shown, the hinge component 120b and the hinge component 120e are designed such that they mate along a diagonal line. This diagonal line, when extended, intersects the fastener 124a. The shaft 122a defines a linear path that, when extended, also intersects the fastener 124a. Similarly, the hinge component 120d and the hinge component 120d are designed such that they mate along a diagonal line that, when extended, intersects the fastener 124b. The shaft 122b defines a linear path that, when extended, also intersects the fastener 124b. In this manner, the fastener 124a and the fastener 124b each define a pivot point for the hinge assembly 114. This will be further illustrated below.

Figure 5:
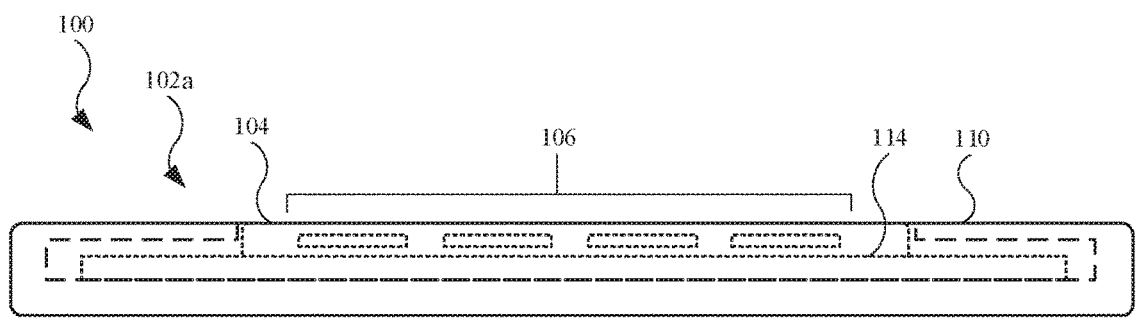
FIG. 5 illustrates a side view of the accessory device, showing the hinge assembly and the panel within the segment.

FIG. 5 illustrates a side view of the accessory device 100, showing the hinge assembly 114 and the panel 104 within the segment 102a. As shown, the panel 104 at least partially covers the hinge assembly 114. The panel 104 may combine with the surface 110 to fully cover the hinge assembly 114 in the stored configuration, as shown in FIG. 5. Also, the hinge components may include a metal. Further, the hinge components of the hinge assembly 114 may include a magnetically attractable material, such as ferrite or a rare Earth magnetic material (as non-limiting examples). In this manner, the magnets 106 in the panel 104 can magnetically couple with the hinge assembly 114. This magnetic coupling may not only provide an attraction force that assists in transitioning the panel 104 and the hinge assembly 114 to the stored configuration, but also provides a force that retains the panel 104 in a manner such that the panel 104 remains co-planar with respect to the surface 110. As a result, the accessory device 100 provides a consistent position, and more aesthetically pleasing configuration, of the panel 104.

Figure 6:
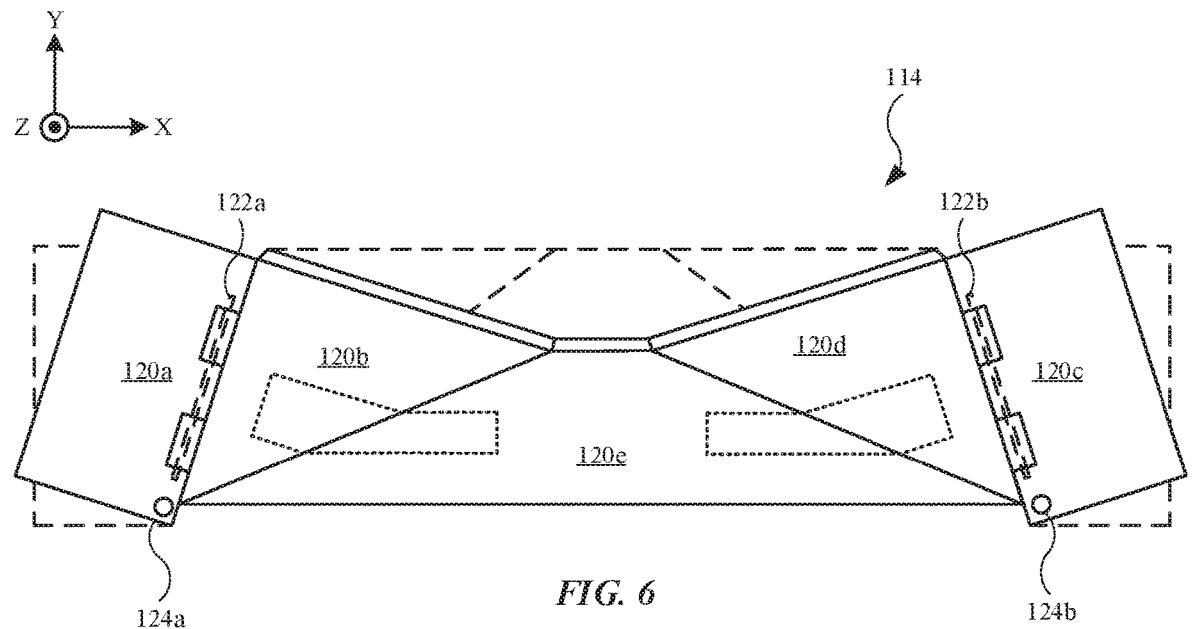
FIG. 6 illustrates a plan view of the hinge assembly, showing an exemplary movement of the hinge assembly.

FIG. 6 illustrates a plan view of the hinge assembly 114, showing an exemplary movement of the hinge assembly 114. The dotted lines represent the original position of the hinge assembly 114 (shown in FIG. 4). As shown, the hinge component 120a is rotated clockwise and the hinge component 120c is rotated counter-clockwise. However, the hinge component 120a and the hinge component 120c remain on, or along, the X-Y plane, and the rotation of the hinge component 120a and the hinge component 120c causes the hinge component 120b and the hinge component 120d, respectively, to at least partially rotate out of the X-Y plane and into a third dimension defined by the Z-axis. Also, the rotation of the hinge component 120b and the hinge component 120d cause the hinge component 120e to at least partially rotate out of the X-Y plane. Also, the hinge component 120a and the hinge component 120b rotate about the fastener 124a, while the hinge component 120c and the hinge component 120d rotate about the fastener 124b. Accordingly, both the fastener 124a and the fastener 124b each define a pivot point.

Figure 7:
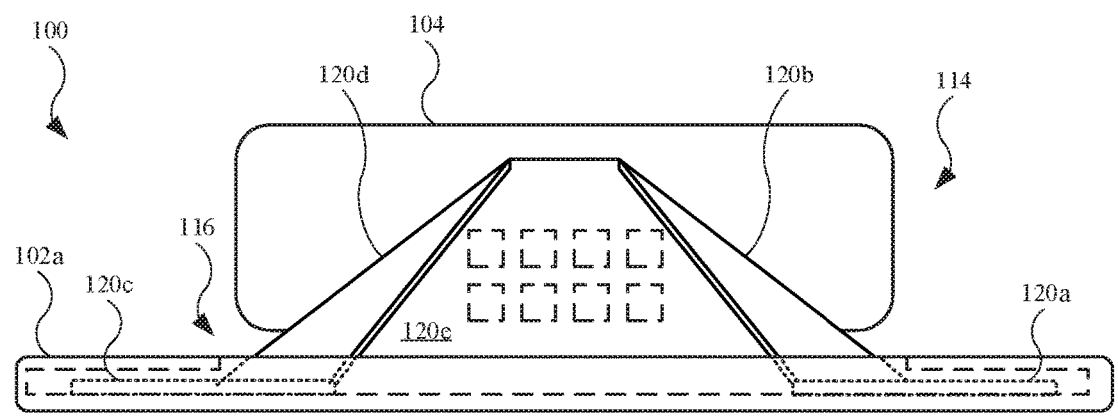
FIG. 7 illustrates a side view of the accessory device, showing the hinge assembly supporting and positioning the panel.

FIG. 7 illustrates a side view of the accessory device 100, showing the hinge assembly 114 supporting and positioning the panel 104. The hinge component 120a and the hinge component 120c remain flat or horizontal and parallel (or at least substantially parallel) with respect to the segment 102a, while the hinge component 120b and the hinge component 120d are at least partially out of the opening 116. Also, the panel 104 is secured to the hinge assembly 114 along the hinge component 120e, with the hinge component 120b and the hinge component 120d providing a three-dimensional support structure. Also, the hinge component 120b and the hinge component 120d are positioned diagonally with respect to the hinge component 120a and the hinge component 120c, respectively. Also, the hinge component 120a is in frictional engagement with the segment 102a, and as a result, the frictional forces between the hinge component 120a and the segment 102a support the hinge component 120b such that the hinge component 120b remains in an upright position. Similarly, the hinge component 120c is in frictional engagement with the segment 102a, and as a result, the frictional forces between the hinge component 120c and the segment 102a support the hinge component 120d such that the hinge component 120d remains in an upright position. In this regard, at least some frictional force are not between the hinge components of the hinge assembly 114, but rather, with other features external to, or outside, the hinge assembly 114. Also, the frictional forces used to maintain an upright and deployed position of the hinge assembly 114 are not dependent upon the thickness of the hinge components themselves.

Figure 8:
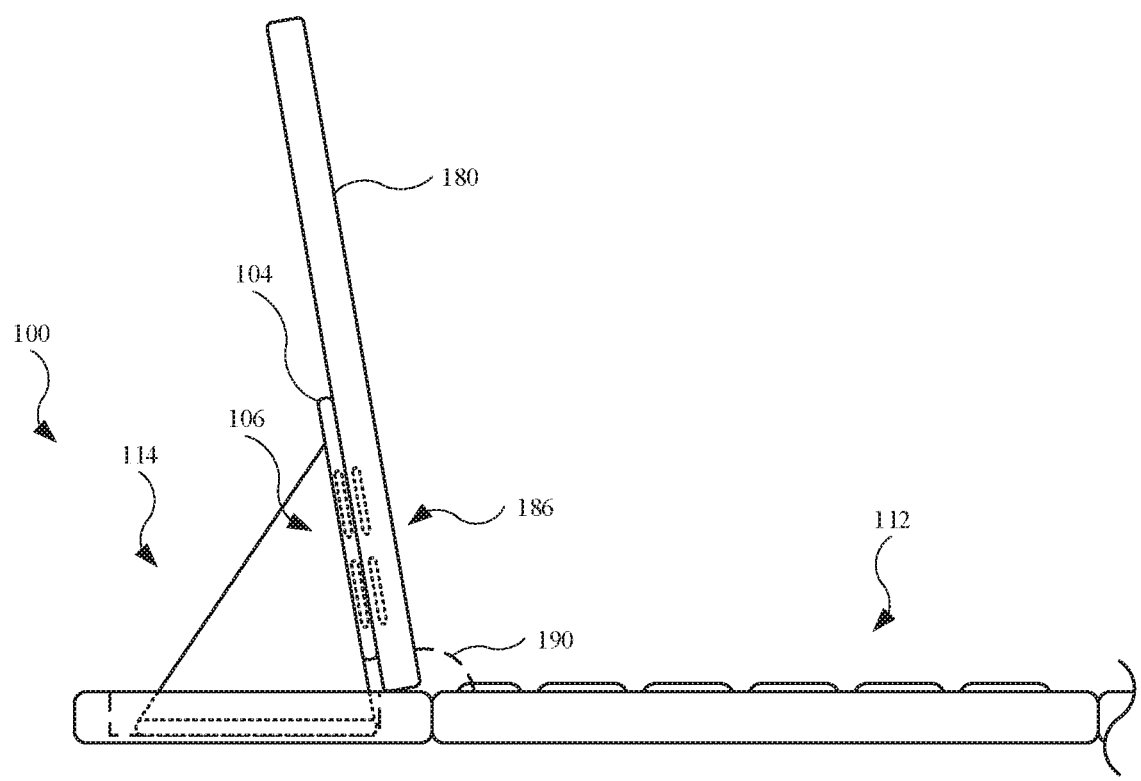
FIG. 8 illustrates a side view of the accessory device, showing the accessory device carrying the portable electronic device, in accordance with some described embodiments.

FIG. 8 illustrates a side view of the accessory device 100, showing the accessory device 100 carrying the portable electronic device 180, in accordance with some described embodiments. As shown, the portable electronic device 180 is supported by the hinge assembly 114. Also, the magnets 106 in the panel 104 are magnetically coupled with the magnets 186 in the portable electronic device 180. Also, the hinge assembly 114 positions the portable electronic device 180 at an angle 190 with respect to the keyboard 112. The angle 190 is approximately 100 degrees. Generally, the hinge assembly 114 can be designed to position the portable electronic device 180 such that the angle 190 is approximately in the range of 90 to 135 degrees.

FIGS. 9-25 illustrate alternate embodiments of hinge assemblies. The accessory device 100 (shown in FIGS. 1 and 2) may substitute the hinge assembly 114 (shown in FIG. 2) with any of the hinge assemblies shown in FIGS. 9-25.

Figure 9:
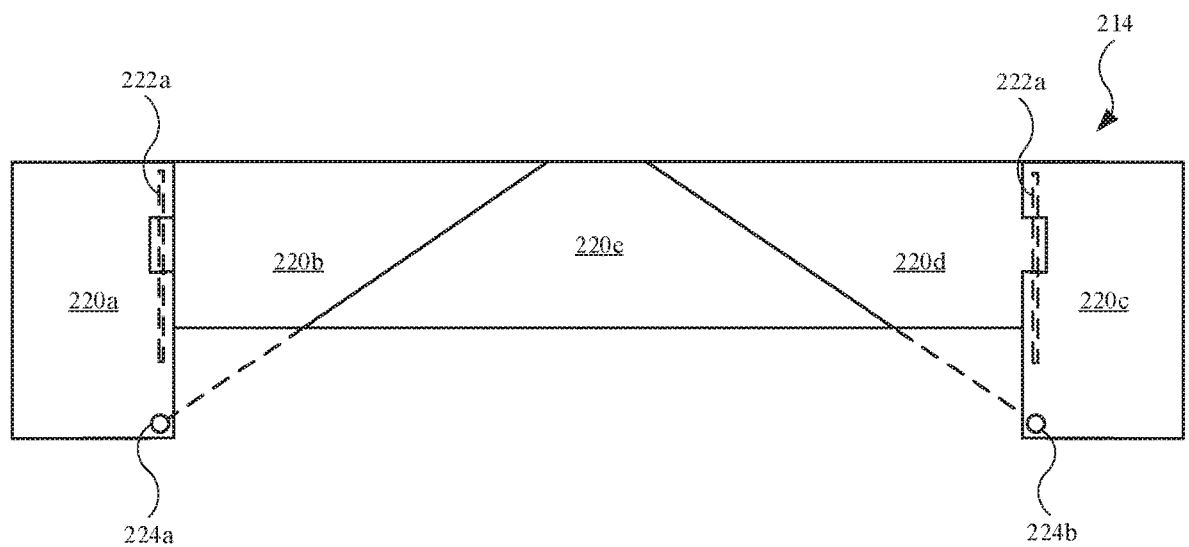
FIG. 9 illustrates a plan view of an alternate embodiment of a hinge assembly, in accordance with some described embodiments.

FIG. 9 illustrates a plan view of an alternate embodiment of a hinge assembly 214, in accordance with some described embodiments. The hinge assembly 214 may include features previously described herein for another hinge assembly. As shown, the hinge assembly 214 includes a hinge component 220a coupled with a hinge component 220b by a joint that allows relative movement between the hinge component 220a and the hinge component 220b, and a hinge component 220c coupled with a hinge component 220d by a joint that allows relative movement between the hinge component 220c and the hinge component 220d. In order to secure the hinge component 220a and the hinge component 220b to a segment of an accessory device (not shown in FIG. 9), a fastener 224a may extend through an opening of the hinge component 220a. In order to secure the hinge component 220c and the hinge component 220d to a segment of an accessory device (not shown in FIG. 9), a fastener 224b may extend through an opening of the hinge component 220c.

The fastener 224a can define a rotational axis for the hinge component 220a and the hinge component 220b, and the fastener 224b can define a rotational axis for the hinge component 220c and the hinge component 220d. For example, the hinge component 220b and the hinge component 220e are designed such that they mate along a diagonal line. This diagonal line, when extended, intersects the fastener 224a. A shaft 222a (connecting the hinge component 220a with the hinge component 220b) defines a linear path that, when extended, also intersects the fastener 224a. Similarly, the hinge component 220d and the hinge component 220d are designed such that they mate along a diagonal line that, when extended, intersects the fastener 224b. A shaft 222b (connecting the hinge component 220c with the hinge component 220d) defines a linear path that, when extended, also intersects the fastener 224b. In this manner, the fastener 224a and the fastener 224b each define a pivot point for the hinge assembly 214.

The hinge assembly 214 may further include hinge component 220e. The hinge component 220e designed to receive a panel (not shown in FIG. 9) used as a receiving surface for a portable electronic device. The hinge component 220e may couple with the hinge component 220b and the hinge component 220d by flexible members (not shown in FIG. 9) that form joints to allow movement between the hinge component 220e and both the hinge component 220b and the hinge component 220d.

The hinge assembly 214 can be positioned in both a stored configuration and a deployed configuration, in a manner previously described. However, the layout of the hinge components may differ as compared the hinge assembly 114 (shown in FIG. 4). For example, the hinge component 220b does not extend end-to-end with the hinge component 220a, as compared to the hinge component 120b and the hinge component 120a (shown in FIG. 4). Further, the hinge component 220d does not extend end-to-end with the hinge component 220c, as compared to the hinge component 120c and the hinge component 120d (shown in FIG. 4). Also, the hinge component 220e extends end-to-end with the hinge component 220b and the hinge component 220c, and accordingly, the hinge component 220e does not extend end-to-end with the hinge component 220a or the hinge component 220c. However, the hinge component 220b shares a common axis of rotation, defined by the fastener 224*a*, with the hinge component 220*a*, and the hinge component 220*d* shares a common axis of rotation, defined by the fastener 224*b*, with the hinge component 220*c*.

Figure 10:
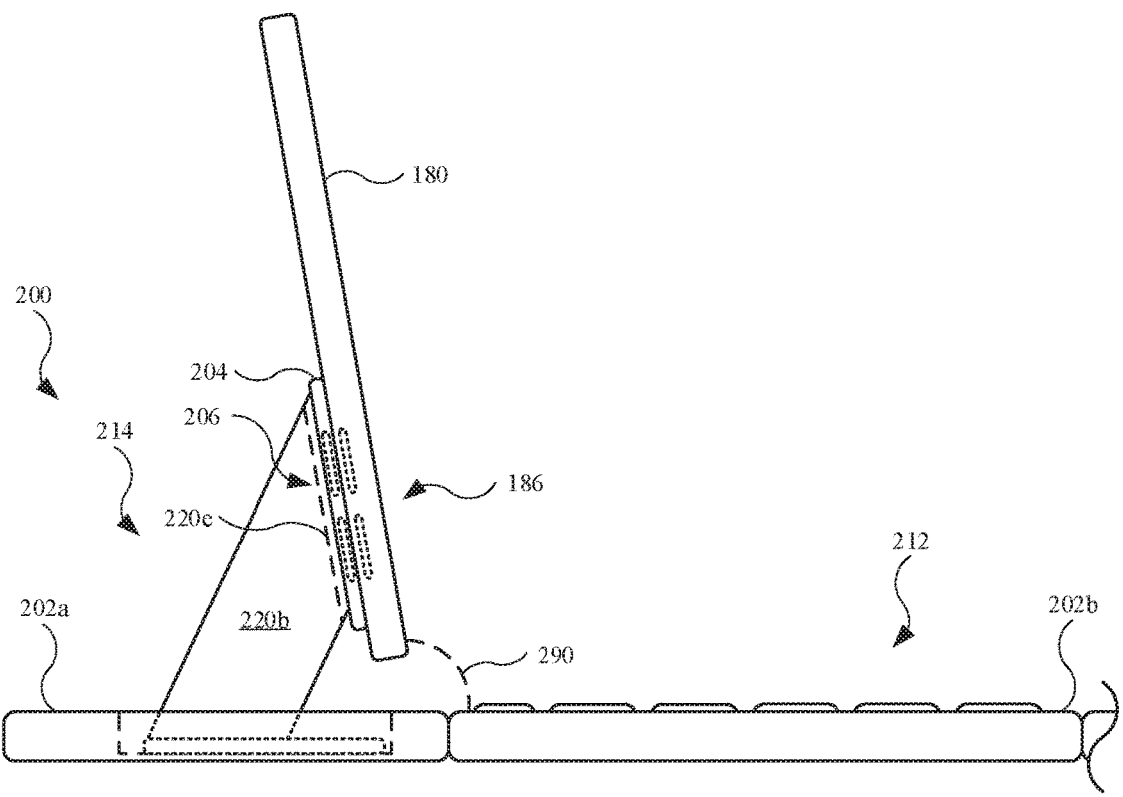
FIG. 10 illustrates a side view of an embodiment of an accessory device, showing the accessory device carrying the electronic device, in accordance with some described embodiments.

FIG. 10 illustrates a side view of an embodiment of an accessory device 200, showing the accessory device 200 carrying the portable electronic device 180, in accordance with some described embodiments. The accessory device 200 may include any features described herein for an accessory device. As shown, the portable electronic device 180 is supported by the hinge assembly 214 (shown in FIG. 9). Also, the accessory device 200 includes a panel 204 that includes magnets 206 that magnetically couple with the magnets 186 in the portable electronic device 180. Also, the hinge assembly 214 positions the portable electronic device 180 at an angle 290 with respect to a keyboard 212 located on a segment 202*b* of the accessory device 200. The angle 290 may include any angle described for the angle 190 (shown in FIG. 8).

The hinge assembly 214 can carry the portable electronic device 180 such that the portable electronic device 180 is suspended over a segment 202*a* of the hinge assembly 214. In other words, the portable electronic device 180, when engaged with the panel 204 and carried by the hinge assembly 214, is not positioned on the segment 202*b*. Also, as shown in FIG. 10, based on the dimensions of the hinge component 220*b* and the hinge component 220*e*, the hinge component 220*b* and the hinge component 220*e* do not extend to the segment 202*a*, and a space or clearance exists between the hinge assembly 214 and the segment 202*a*.

Figure 11:
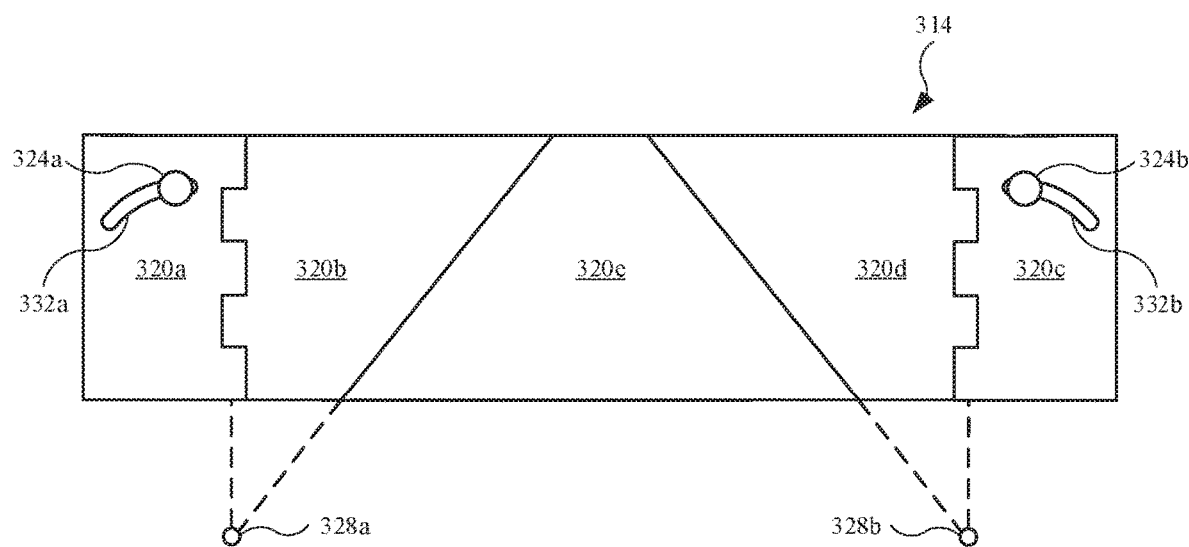
FIG. 11 illustrates a plan view of an alternate embodiment of a hinge assembly, in accordance with some described embodiments.

FIG. 11 illustrates a plan view of an alternate embodiment of a hinge assembly 314, in accordance with some described embodiments. The hinge assembly 314 may incorporate features from other hinge assemblies described herein. As shown, the hinge assembly 314 includes a hinge component 320*a* coupled with a hinge component 320*b* by a joint that allows relative movement between the hinge component 320*a* and the hinge component 320*b*, and a hinge component 320*c* coupled with a hinge component 320*d* by a joint that allows relative movement between the hinge component 320*c* and the hinge component 320*d*.

As compared to prior embodiments, the hinge assembly 314 includes modifications. For example, the hinge component 320*a* includes a fastener 324*a* that passes through a slot 332*a* formed in the hinge component 320*a*, and the hinge component 320*c* includes a fastener 324*b* that passes through a slot 332*b* formed in the hinge component 320*b*. The fastener 324*a* and the fastener 324*b* may secure the hinge assembly 314 to an accessory device (not shown in FIG. 11).

Unlike prior embodiments, the fasteners shown in FIG. 11 do not represent axes of rotation for the hinge components. Furthermore, the axes of rotation of the hinge assembly 314 lie outside the hinge components of the hinge assembly 314. For example, based upon the geometry of the hinge component 320*b*, the hinge component 320*a* and the hinge component 320*b* share an axis of rotation 328*a*. Also, based upon the geometry of the hinge component 320*d*, the hinge component 320*c* and the hinge component 320*d* share an axis of rotation 328*b*. As shown, the axis of rotation 328*a* and the axis of rotation 328*b* lie outside the hinge assembly 314.

The hinge assembly 314 may further include hinge component 320*e*. The hinge component 320*e* designed to receive a panel (not shown in FIG. 11) used as a receiving surface for a portable electronic device. The hinge component 320*e* may couple with the hinge component 320*b* and the hinge component 320*d* by flexible members (not shown in FIG. 11) that form joints to allow movement between the hinge component 320*e* and both the hinge component 320*b* and the hinge component 320*d*. During motion of the hinge assembly 314, the dimensions of the slot 332*a* and the slot 332*b* allow the hinge component 320*a* and the hinge component 320*c*, respectively, to move. The hinge component 320*a* and the hinge component 320*c* can be guided at least partially by the fastener 324*a* and the fastener 324*b*, respectively.

Figure 12:
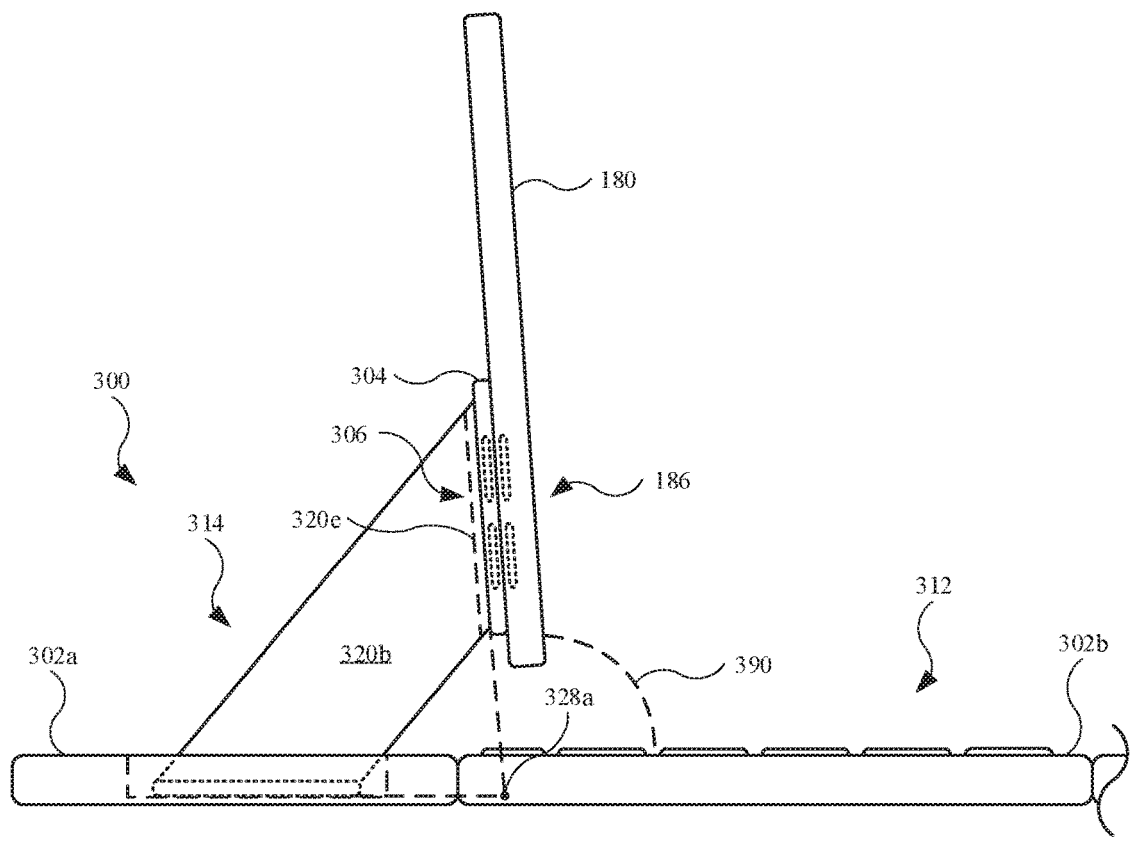
FIG. 12 illustrates a side view of an embodiment of an accessory device with the hinge assembly shown in FIG. 11, showing the accessory device carrying the electronic device, in accordance with some described embodiments.

FIG. 12 illustrates a side view of an embodiment of an accessory device 300, showing the accessory device 300 carrying the portable electronic device 180, in accordance with some described embodiments. The accessory device 300 may include any features described herein for an accessory device. As shown, the portable electronic device 180 is supported by the hinge assembly 314. Also, the accessory device 300 includes a panel 304 that includes magnets 306 that magnetically couple with the magnets 186 in the portable electronic device 180. Also, the hinge assembly 314 positions the portable electronic device 180 at an angle 390 with respect to a keyboard 312 located on a segment 302*b* of the accessory device 300. The angle 390 may include any angle described for the angle 190 (shown in FIG. 8).

The hinge assembly 314 can carry the portable electronic device 180 such that the portable electronic device 180 is suspended over a segment 302*a* of the hinge assembly 314. Furthermore, the hinge assembly 314 can carry the portable electronic device 180 such that the portable electronic device 180 is suspended over the keyboard 312. As shown, the axis of rotation 328*a* lies in the segment 302*b* and outside of the hinge assembly 314. The axis of rotation 328*b* (not shown in FIG. 12) may also lie in the segment 302*b* and outside of the hinge assembly 314. Also, based upon the dimensions of the hinge component 320*b* and the hinge component 320*e*, the hinge component 320*b* and the hinge component 320*e* do not extend to the segment 302*a*, and a space or clearance exists between the hinge assembly 314 and the segment 302*a*. It should be noted that the accessory device 300 may substitute other hinge assemblies described herein, such as the hinge assembly 514 shown in FIGS. 16 and 17 below.

Figure 13:
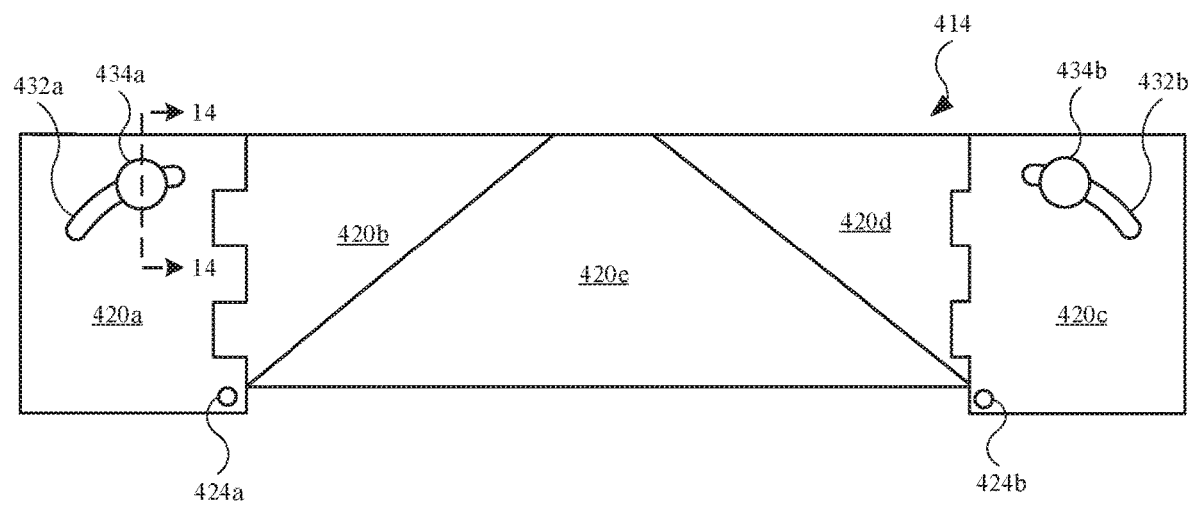
FIG. 13 illustrates a plan view of an alternate embodiment of a hinge assembly, in accordance with some described embodiments.

FIG. 13 illustrates a plan view of an alternate embodiment of a hinge assembly 414, in accordance with some described embodiments. The hinge assembly 414 may include features from other hinge assemblies described herein. As shown, the hinge assembly 414 includes a hinge component 420*a* coupled with a hinge component 420*b* by a joint that allows relative movement between the hinge component 420*a* and the hinge component 420*b*, and a hinge component 420*c* coupled with a hinge component 420*d* by a joint that allows relative movement between the hinge component 420*c* and the hinge component 420*d*. In order to secure the hinge component 420*a* and the hinge component 420*b* to a segment of an accessory device (not shown in FIG. 13), a fastener 424*a* may extend through an opening of the hinge component 420*a*. In order to secure the hinge component 420*c* and the hinge component 420*d* to a segment of an accessory device (not shown in FIG. 13), a fastener 424*b* may extend through an opening of the hinge component 420*c*. The fastener 424*a* can define a rotational axis for the hinge component 420*a* and the hinge component 420*b*, and the fastener 424*b* can define a rotational axis for the hinge component 420*c* and the hinge component 420*d*.

The hinge assembly 414 may further include hinge component 420*e*. The hinge component 420*e* is designed to receive a panel (not shown in FIG. 13) used as a receiving surface for a portable electronic device. The hinge component 420e may couple with the hinge component 420b and the hinge component 420d by flexible members (not shown in FIG. 13) that form joints to allow movement between the hinge component 420e and both the hinge component 420b and the hinge component 420d.

The hinge assembly 414 incorporate additional features designed to provide frictional forces. For example, the hinge component 420a may include a slot 432a and a fastener 434a passing through the slot 432a, and the hinge component 420c may include a slot 432b and a fastener 434b passing through the slot 432b. The fastener 434a and the fastener 434b may provide a clamping force to the hinge component 420a and the hinge component 420c, respectively, thereby adding frictional forces. This may provide additional support when the hinge assembly 414 is in a deployed configuration (previously shown for other hinge assemblies) and holding a portable electronic device. Also, the slot 432a and the slot 432b can be curved to define a circular arch centered at the fastener 424a and the fastener 424b, respectively, as the fasteners each represent an axis of rotation.

Figure 14:
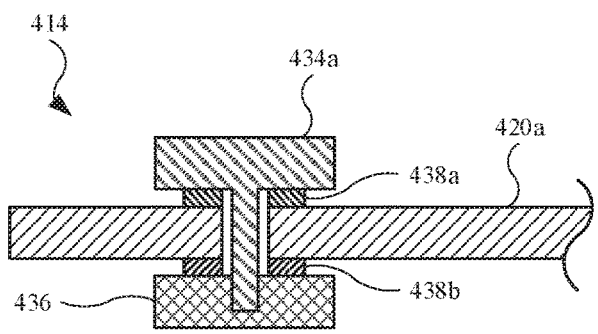
FIG. 14 illustrates a cross sectional view of the hinge assembly shown in FIG. 13, showing the relationship between the fastener and the hinge component.

FIG. 14 illustrates a cross sectional view of the hinge assembly 414 shown in FIG. 13, showing the relationship between the fastener 434a and the hinge component 420a. As shown, the fastener 434a passes through the slot 432a (labeled in FIG. 13) of the hinge component 420a and couples with a securing member 436. Further, the fastener 434a passes through a friction element 438a and a friction element 438b, each of which may include a washer. The friction element 438a and the friction element 438b engage opposing sides of the hinge component 420a. When the hinge assembly 414 transitions from a stored to a deployed configuration (previously shown for other hinge assemblies), the hinge component 420a moves relative to the friction element 438a and the friction element 438b. However, the friction element 438a and the friction element 438b can provide frictional forces that cause the hinge component 420a to remain in a static position. In this regard, the friction element 438a and the friction element 438b support the hinge component 420a by resisting movement when, for example, the hinge assembly 414 (and in particular, the hinge component 420a) is supporting the weight of a portable electronic device. As a result, the hinge component 420a (as well as other hinge components) need not include added thickness and can remain relatively thin. Accordingly, an accessory device carrying the hinge assembly 414 does not include increased weight due to the hinge assembly 414. It should be noted that the hinge component 420c and the fastener 434b (shown in FIG. 13) may include similar features described for the hinge component 420a and the fastener 434a, respectively.

Figure 15:
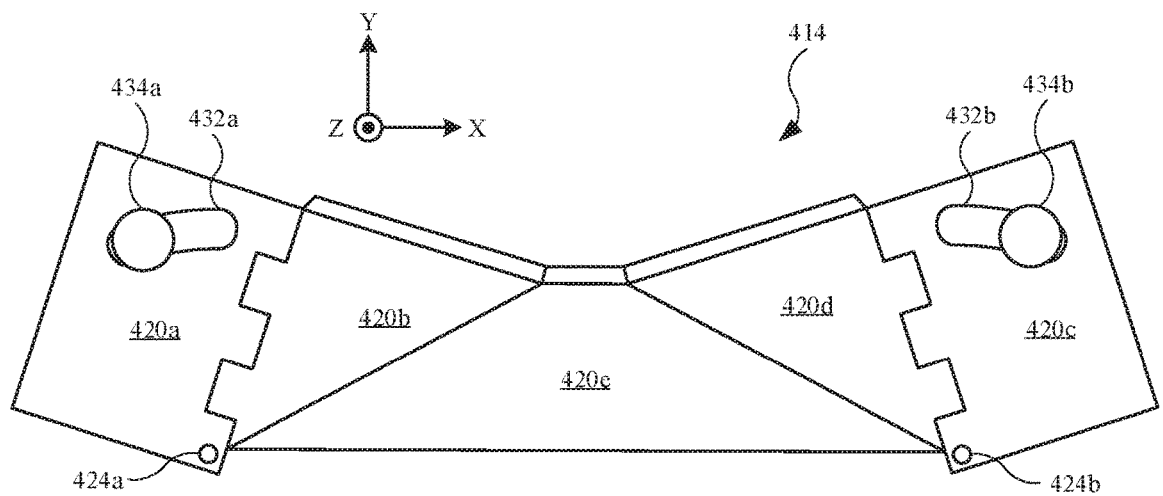
FIG. 15 illustrates a plan view of the accessory device shown in FIG. 13, showing an exemplary movement of the hinge assembly.

FIG. 15 illustrates a plan view of the hinge assembly 414 shown in FIG. 13, showing an exemplary movement of the hinge assembly 414. As shown, the hinge component 420a is rotated clockwise and the hinge component 420c is rotated counter-clockwise. However, the hinge component 420a and the hinge component 420c remain on, or along, the X-Y plane. Due to the rotation of the hinge component 420a, the hinge component 420b is rotated out of the X-Y plane and into a third dimension defined by the Z-axis. Also, due to the rotation of the hinge component 420c, the hinge component 420d is rotated out of the X-Y plane and into a third dimension defined by the Z-axis. The hinge component 420a and the hinge component 420b rotate about the fastener 424a, and the hinge component 420c and the hinge component 420d rotate about the fastener 424b. Also, the rotation of the hinge component 420b and the hinge component 420d cause the hinge component 420e to also rotate out of the X-Y plane. The hinge component 420a and the hinge component 420c move/rotate relative to the fastener 434a and the fastener 434b, respectively. In this regard, the fastener 434a and the fastener 434b provide a frictional force to the hinge component 420a and the hinge component 420c, respectively. Also, in order to adjust the frictional (clamping) forces provided by the fastener 434a and the fastener 434b, the fastener 434a and the fastener 434b can be rotationally driven to increase or decrease the frictional forces.

Figure 16:
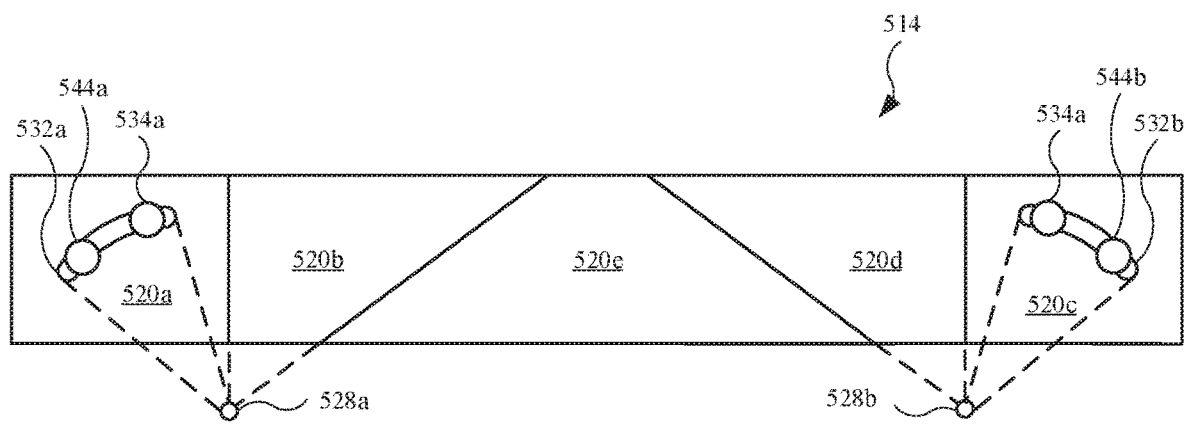
FIG. 16 illustrates a plan view of an alternate embodiment of a hinge assembly, in accordance with some described embodiments.

FIG. 16 illustrates a plan view of an alternate embodiment of a hinge assembly 514, in accordance with some described embodiments. The hinge assembly 514 may include features from other hinge assemblies described herein. As shown, the hinge assembly 514 includes a hinge component 520a coupled with a hinge component 520b by a joint that allows relative movement between the hinge component 220a and the hinge component 220b, and a hinge component 520c coupled with a hinge component 520d by a joint that allows relative movement between the hinge component 520c and the hinge component 520d. The hinge assembly 514 may further include hinge component 520e. The hinge component 520e designed to receive a panel (not shown in FIG. 16) used as a receiving surface for a portable electronic device. The hinge component 520e may couple with the hinge component 520b and the hinge component 520d by flexible members (not shown in FIG. 16) that form joints to allow movement between the hinge component 520e and both the hinge component 520b and the hinge component 520d.

The hinge assembly 514 may incorporate additional features designed to provide frictional forces. For example, the hinge component 520a may include a slot 532a and a fastener 534a passing through the slot 532a, and the hinge component 520c may include a slot 532b and a fastener 534b passing through the slot 532b. The fastener 534a and the fastener 534b may provide a clamping force to the hinge component 520a and the hinge component 520c, respectively, thereby adding frictional forces. This may provide additional support when the hinge assembly 514 is in a deployed configuration (previously shown for other hinge assemblies) and holding a portable electronic device. Also, in order to adjust the frictional (clamping) forces provided by the fastener 534a and the fastener 534b, the fastener 534a and the fastener 534b can be rotationally driven to increase or decrease the frictional forces.

Also, the hinge assembly 514 may include different pivot points. For example, the hinge component 520a may include a fastener 544a that passes through the slot 532a, and the hinge component 520c may include a fastener 544b that passes through the slot 532b. The fastener 544a and the fastener 544b may secure the hinge component 520a and the hinge component 520c, respectively, to a segment of an accessory device (not shown in FIG. 16). Also, the fastener 544a and the fastener 544b may define an axis of rotation for the hinge component 520a and the hinge component 520c, respectively. Alternatively, the hinge assembly 514 may include an axis of rotation 528a and an axis of rotation 528b, both of which lie outside the perimeter of the components of the hinge assembly 514. In these instances, the slot 532a and the slot 532b can be curved to define a circular arch centered at the axis of rotation 528a and the axis of rotation 528a, respectively.

Figure 17:
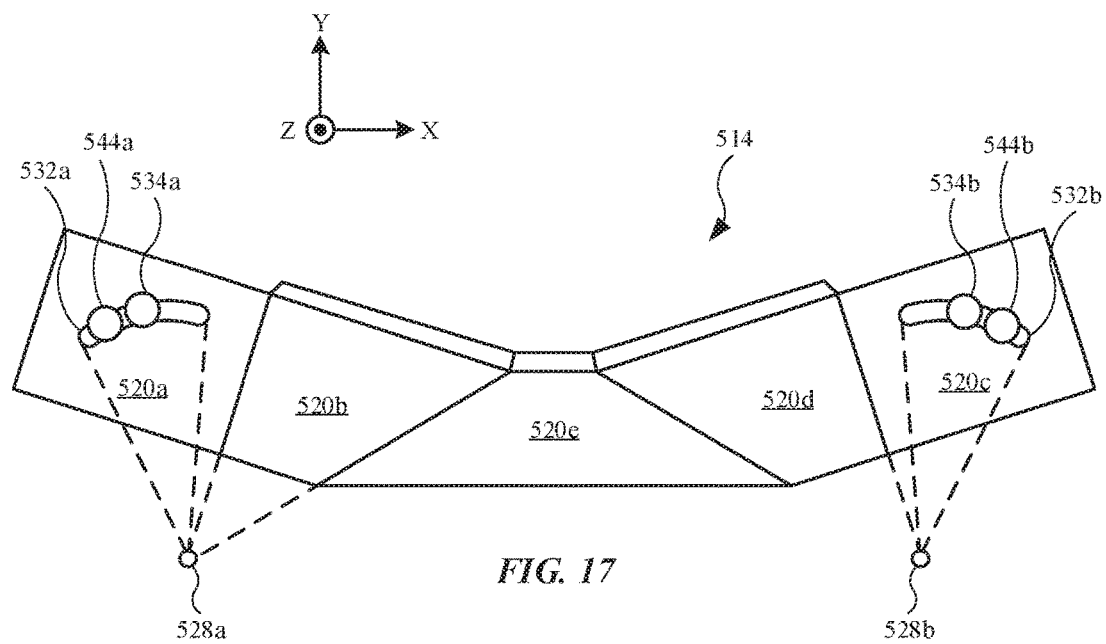
FIG. 17 illustrates a plan view of the hinge assembly shown in FIG. 16, showing an exemplary movement of the hinge assembly.

FIG. 17 illustrates a plan view of the hinge assembly 514 shown in FIG. 16, showing an exemplary movement of the hinge assembly 514. As shown, the hinge component 520a is rotated clockwise and the hinge component 520c is rotated counter-clockwise. However, the hinge component 520a and the hinge component 520c remain on, or along, the X-Y plane. Due to the rotation of the hinge component 520a, the hinge component 520b is rotated out of the X-Y plane and into a third dimension defined by the Z-axis. Also, due to the rotation of the hinge component 520c, the hinge component 520d is rotated out of the X-Y plane and into a third dimension defined by the Z-axis. The hinge component 520a and the hinge component 520c can rotate about the fastener 544a and the fastener 544b, respectively. Also, the rotation of the hinge component 520b and the hinge component 520d cause the hinge component 520e to also rotate out of the X-Y plane. By adjusting (for example, rotationally driving) the fastener 534a and the fastener 534b, the inclination, or tilt, of the hinge component 520a and the hinge component 520c, respectively, can be controlled. Also, the fastener 544a and the fastener 544b provide centrally located pivot points for the hinge component 520a and the hinge component 520c, respectively. Alternatively, when the axis of rotation 528a and the axis of rotation 528b are implemented with the hinge assembly 514, the hinge components may rotate about the axis of rotation 528a and the axis of rotation 528b.

Figure 18:
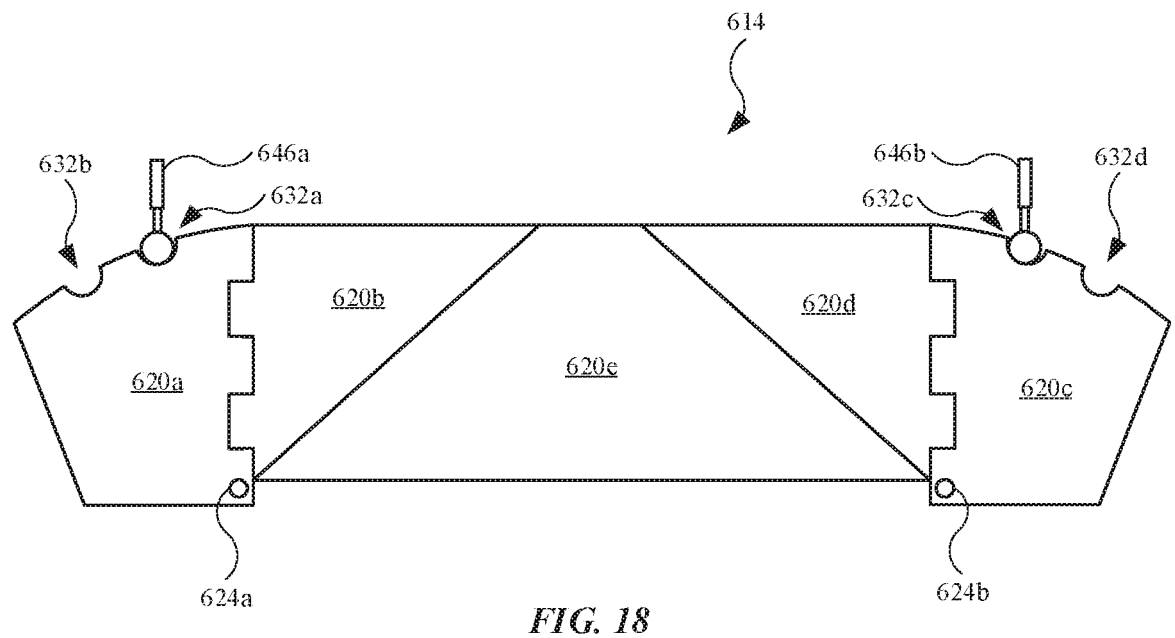
FIG. 18 illustrates a plan view of an alternate embodiment of a hinge assembly, in accordance with some described embodiments.

FIG. 18 illustrates a plan view of an alternate embodiment of a hinge assembly 614, in accordance with some described embodiments. The hinge assembly 614 may include features from other hinge assemblies described herein. As shown, the hinge assembly 614 includes a hinge component 620a coupled with a hinge component 620b by a joint that allows relative movement between the hinge component 620a and the hinge component 620b, and a hinge component 620c coupled with a hinge component 620d by a joint that allows relative movement between the hinge component 620c and the hinge component 620d. In order to secure the hinge component 620a and the hinge component 620b to a segment of an accessory device (not shown in FIG. 18), a fastener 624a may extend through an opening of the hinge component 620a. In order to secure the hinge component 620c and the hinge component 620d to a segment of an accessory device (not shown in FIG. 18), a fastener 624b may extend through an opening of the hinge component 620c. The fastener 624a can define a rotational axis for the hinge component 620a and the hinge component 620b, and the fastener 624b can define a rotational axis for the hinge component 620c and the hinge component 620d. The hinge assembly 614 may further include hinge component 620e. The hinge component 620e designed to receive a panel (not shown in FIG. 18) used as a receiving surface for a portable electronic device. The hinge component 620e may couple with the hinge component 620b and the hinge component 620d by flexible members (not shown in FIG. 18) that allow relative movement between the hinge component 620e and both hinge component 620b and the hinge component 620d.

The hinge assembly 614 incorporate additional features designed to place the hinge assembly 614 in discrete positions. For example, the hinge component 620a may include a slot 632a and a slot 632b. The hinge assembly 614 may include a roller element 646a designed to hold the hinge component 620a, and in turn, the hinge assembly 614, in different positions. As shown, the roller element 646a is in the slot 632a, and the hinge assembly 614 is in a stored configuration. However, when the hinge assembly 614 transitions to a deployed configuration, the hinge component 620a rotates relative to the roller element 646a, and the roller element 646a moves into the slot 632b. Similarly, the hinge component 620c may include a slot 632c and a slot 632d. The hinge assembly 614 may include a roller element 646b designed to hold the hinge component 620c, and in turn, the hinge assembly 614, in different positions. As shown, the roller element 646b is in the slot 632c, and the hinge assembly 614 is in a stored configuration. However, when the hinge assembly 614 transitions to a deployed configuration, the hinge component 620c rotates relative to the roller element 646b, and the roller element 646b moves into the slot 632d.

Figure 19:
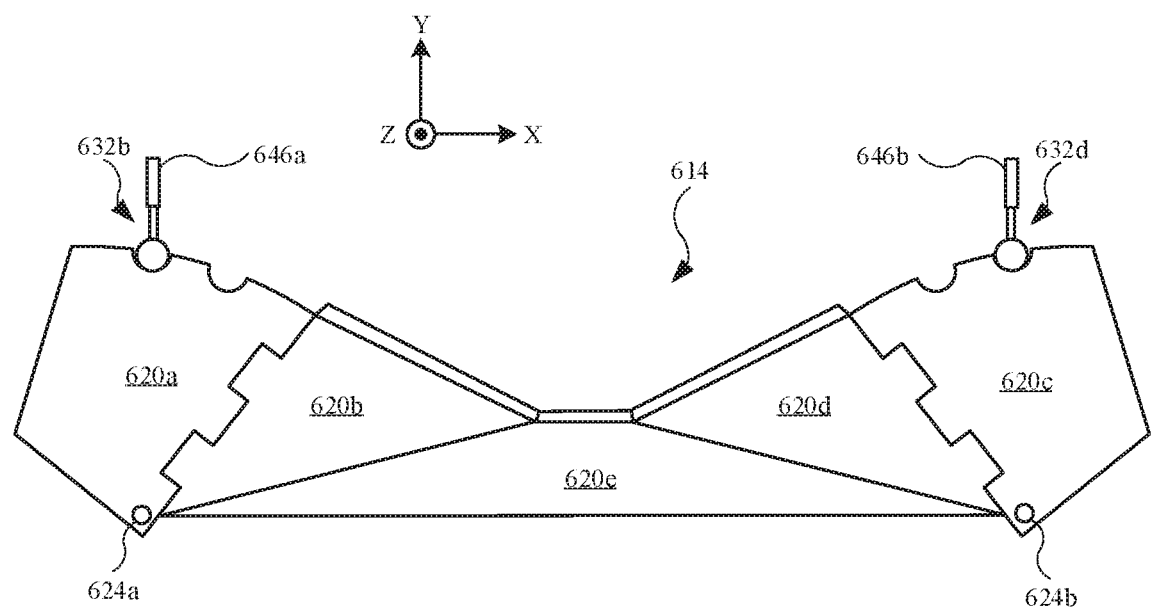
FIG. 19 illustrates a plan view of the hinge assembly shown in FIG. 18, showing an exemplary movement of the hinge assembly.

FIG. 19 illustrates a plan view of the hinge assembly 614 shown in FIG. 18, showing an exemplary movement of the hinge assembly 614. As shown, the hinge component 620a is rotated clockwise and the hinge component 620c is rotated counter-clockwise. However, the hinge component 620a and the hinge component 620c remain on, or along, the X-Y plane. Due to the rotation of the hinge component 620a, the hinge component 620b is rotated out of the X-Y plane and into a third dimension defined by the Z-axis. Also, due to the rotation of the hinge component 620c, the hinge component 620d is rotated out of the X-Y plane and into a third dimension defined by the Z-axis. The hinge component 620a and the hinge component 620b can rotate about the fastener 624a, and the hinge component 620c and the hinge component 620d can rotate about the fastener 624b. The rotation of the hinge component 620b and the hinge component 620d cause the hinge component 620e to also rotate out of the X-Y plane. Also, the roller element 646a moves into the slot 632b, and the roller element 646b moves into the slot 632d. The roller element 646a and the roller element 646b provide a force to the hinge component 620a and the hinge component 620c, respectively, to maintain the hinge assembly 614 in the deployed configuration, even when the hinge assembly 614 is supporting the weight of a portable electronic device (not shown in FIG. 19).

Figure 20:
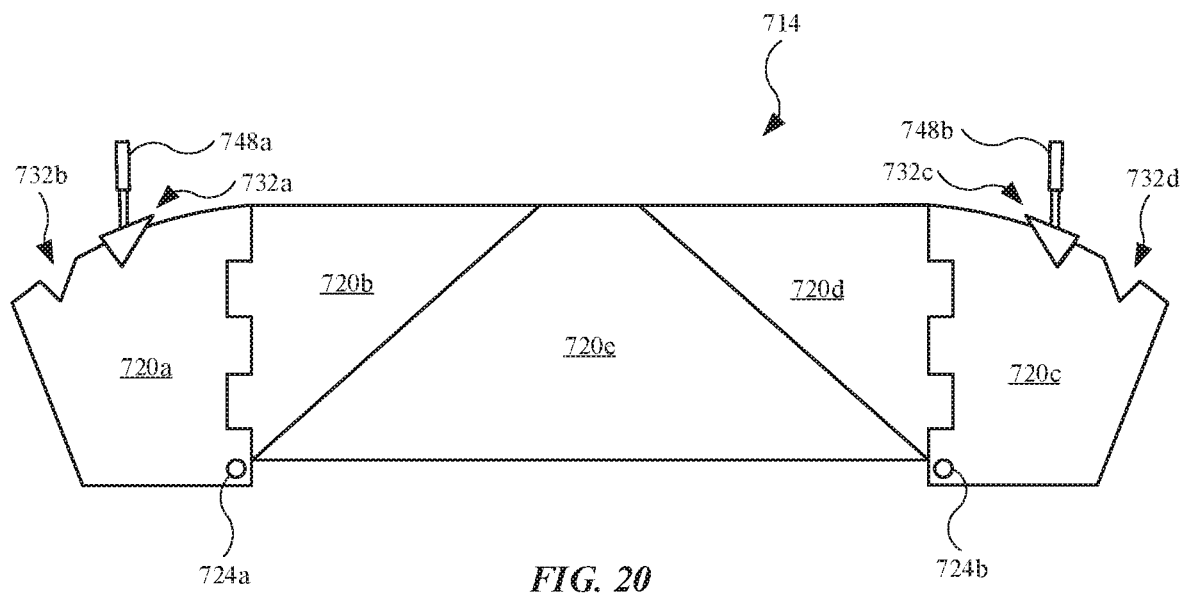
FIG. 20 illustrates a plan view of an alternate embodiment of a hinge assembly, in accordance with some described embodiments.

FIG. 20 illustrates a plan view of an alternate embodiment of a hinge assembly 714, in accordance with some described embodiments. The hinge assembly 714 may include features from other hinge assemblies described herein. As shown, the hinge assembly 714 includes a hinge component 720a coupled with a hinge component 720b by a joint that allows relative movement between the hinge component 720a and the hinge component 720b, and a hinge component 720c that couples with a hinge component 720d by a joint that allows relative movement between the hinge component 720c and the hinge component 720d. In order to secure the hinge component 720a and the hinge component 720b to a segment of an accessory device (not shown in FIG. 20), a fastener 724a may extend through an opening of the hinge component 720a. In order to secure the hinge component 720c and the hinge component 720d to a segment of an accessory device (not shown in FIG. 20), a fastener 724b may extend through an opening of the hinge component 720c. The fastener 724a can define a rotational axis for the hinge component 720a and the hinge component 720b, and the fastener 724b can define a rotational axis for the hinge component 720c and the hinge component 720d. The hinge assembly 714 may further include hinge component 720e. The hinge component 720e designed to receive a panel (not shown in FIG. 20) used as a receiving surface for a portable electronic device. The hinge component 720e may couple with the hinge component 720b and the hinge component 720d by flexible members (not shown in FIG. 20) that allow relative movement between the hinge component 720e and both the hinge component 720b and the hinge component 720d.

The hinge assembly 714 incorporate additional features designed to place the hinge assembly 714 in discrete positions. For example, the hinge component 720a may include a slot 732a and a slot 732b. The hinge assembly 714 may include an engagement element 748a designed to hold the hinge component 720a, and in turn, the hinge assembly 714, in different positions. As shown, the engagement element 748a is in the slot 732a, and the hinge assembly 714 is in a stored configuration. However, when the hinge assembly 714 transitions to a deployed configuration, the hinge component 720a rotates relative to the engagement element 748a, and the engagement element 748a moves into the slot 732b. Unlike the embodiments shown in FIGS. 18 and 19, the slot 732a and the slot 732b define a saw tooth slot, and the engagement element 748a includes a corresponding saw tooth design. Further, based upon the design orientation on the slot 732a and the slot 732b, the engagement element 748a may promote movement from the stored configuration (shown in FIG. 20) to a deployed configuration (shown below). Moreover, based upon the design orientation on the slot 732a and the slot 732b, the engagement element 748a may impede movement from the deployed configuration (shown below) to the stored configuration shown in FIG. 20. As a result, the engagement element 748a resist rotational movement of the hinge component 720a in the counter-clockwise motion when the hinge assembly 714 transitions from the deployed configuration to the stored configuration.

Similarly, the hinge component 720c may include a slot 732c and a slot 732d. The hinge assembly 714 may include an engagement element 748b designed to hold the hinge component 720c, and in turn, the hinge assembly 714, in different positions. As shown, the engagement element 748b is in the slot 732c, and the hinge assembly 714 is in a stored configuration. However, when the hinge assembly 714 transitions to a deployed configuration, the hinge component 720c rotates relative to the engagement element 748b, and the engagement element 748b moves into the slot 732d. The slot 732c and the slot 732d define a saw tooth slot, and the engagement element 748b includes a corresponding saw tooth design. Further, based upon the design orientation on the slot 732c and the slot 732d, the engagement element 748b may promote movement from the stored configuration (shown in FIG. 20) to a deployed configuration (shown below). Moreover, based upon the design orientation on the slot 732c and the slot 732d, the engagement element 748b may impede movement from the deployed configuration (shown below) to the stored configuration shown in FIG. 20. As a result, the engagement element 748a resist rotational movement of the hinge component 720c in the clockwise motion when the hinge assembly 714 transitions from the deployed configuration to the stored configuration.

Figure 21:
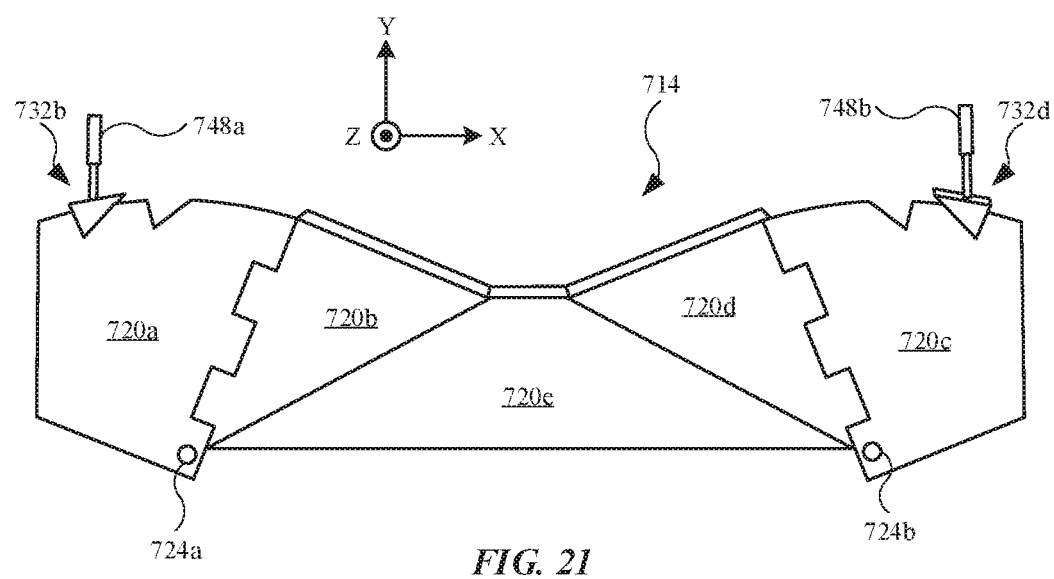
FIG. 21 illustrates a plan view of the hinge assembly shown in FIG. 20, showing an exemplary movement of the hinge assembly.

FIG. 21 illustrates a plan view of the hinge assembly 714 shown in FIG. 20, showing an exemplary movement of the hinge assembly 714. As shown, the hinge component 720a is rotated clockwise and the hinge component 720c is rotated counter-clockwise. However, the hinge component 720a and the hinge component 720c remain on, or along, the X-Y plane. Due to the rotation of the hinge component 720a, the hinge component 720b is rotated out of the X-Y plane and into a third dimension defined by the Z-axis. Also, due to the rotation of the hinge component 720c, the hinge component 720d is rotated out of the X-Y plane and into a third dimension defined by the Z-axis. The hinge component 720a and the hinge component 720b rotate about the fastener 724a, and the hinge component 720c and the hinge component 720d rotate about the fastener 724b. The rotation of the hinge component 720b and the hinge component 720d cause the hinge component 720e to also rotate out of the X-Y plane. Also, the engagement element 748a moves into the slot 732b, and the engagement element 748b moves into the slot 732d. The engagement element 748a and the engagement element 748b provide a force to the hinge component 720a and the hinge component 720c, respectively, to maintain the hinge assembly 714 in the deployed configuration, even when the hinge assembly 714 is supporting the weight of a portable electronic device (not shown in FIG. 21). The engagement element 748a and the engagement element 748b provide the hinge assembly 714 with an asymmetric force profile, as the force required to transition the hinge assembly 714 from the stored configuration to the deployed configuration (shown in FIG. 21) is less than the force required to transition the hinge assembly 714 from the deployed configuration to the stored configuration. This may prevent the hinge assembly 714 from an unwanted transition (to the stored configuration) when, for example, the hinge assembly 714 is supporting the portable electronic device.

Figure 22:
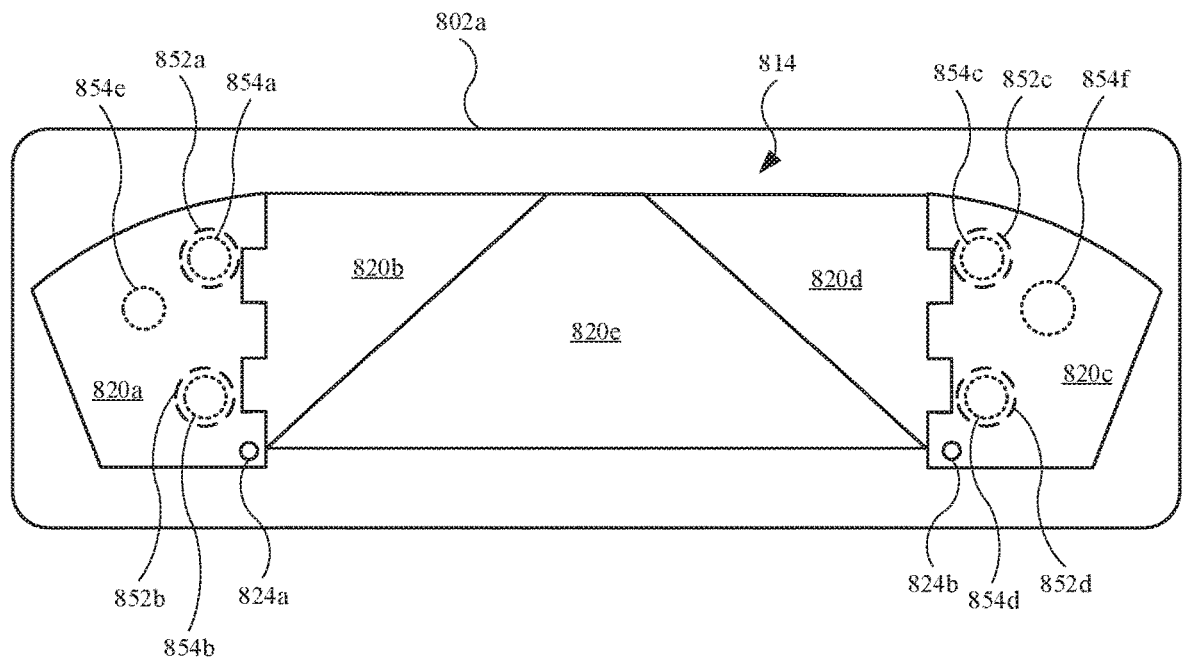
FIG. 22 illustrates a plan view of an alternate embodiment of a hinge assembly, in accordance with some described embodiments.

FIG. 22 illustrates a plan view of an alternate embodiment of a hinge assembly 814, in accordance with some described embodiments. The hinge assembly 814 may include features from other hinge assemblies described herein. As shown, the hinge assembly 814 is positioned over a segment 802a. The hinge assembly 814 may include a hinge component 820a coupled with a hinge component 820b by a joint that allows relative movement between the hinge component 820a and the hinge component 820b, and a hinge component 820c coupled with a hinge component 820d by a joint that allows relative movement between the hinge component 820c and the hinge component 820d. In order to secure the hinge component 820a and the hinge component 820b to a segment of an accessory device (not shown in FIG. 22), a fastener 824a may extend through an opening of the hinge component 820a. In order to secure the hinge component 820c and the hinge component 820d to a segment of an accessory device (not shown in FIG. 22), a fastener 824b may extend through an opening of the hinge component 820c. The fastener 824a can define a rotational axis for the hinge component 820a and the hinge component 820b, and the fastener 824b can define a rotational axis for the hinge component 820c and the hinge component 820d. The hinge assembly 814 may further include hinge component 820e. The hinge component 820e designed to receive a panel (not shown in FIG. 22) used to engage and retain a portable electronic device. The hinge component 820e may couple with the hinge component 820b and the hinge component 820d by flexible members (not shown in FIG. 22) that allow relative movement between the hinge component 820e and both the hinge component 820b and the hinge component 820d.

The hinge assembly 814 may incorporate additional features designed to place the hinge assembly 814 in discrete positions. For example, the hinge component 820a may include a magnet 852a and a magnet 852b. The segment 802a may include a magnet 854a and a magnet 854b designed to magnetically couple with the magnet 852a and the magnet 852b, respectively. The segment 802a may further include a magnet 854e. The magnetic coupling is designed to hold the hinge component 820a, and in turn, the hinge assembly 814, in different positions. As shown, the hinge assembly 814 is in a stored configuration. However, when the hinge assembly 814 transitions to a deployed configuration, the hinge component 820a rotates, and the magnet 852a in the hinge component 820a is aligned and magnetically coupled with the magnet 854e in the segment 802a. This will be shown below. Similarly, the hinge component 820c may include a magnet 852c and a magnet 852d. The segment 802a may include a magnet 854c and a magnet 854d designed to magnetically couple with the magnet 852c and the magnet 852d, respectively. The segment 802a may further include a magnet 854f. The magnetic coupling is designed to hold the hinge component 820c, and in turn, the hinge assembly 814, in different positions. As shown, the hinge assembly 814 is in a stored configuration. However, when the hinge assembly 814 transitions to a deployed configuration, the hinge component 820c rotates, and the magnet 852c in the hinge component 820a is aligned and magnetically coupled with the magnet 854f in the segment 802a. This will be shown below.

Figure 23:
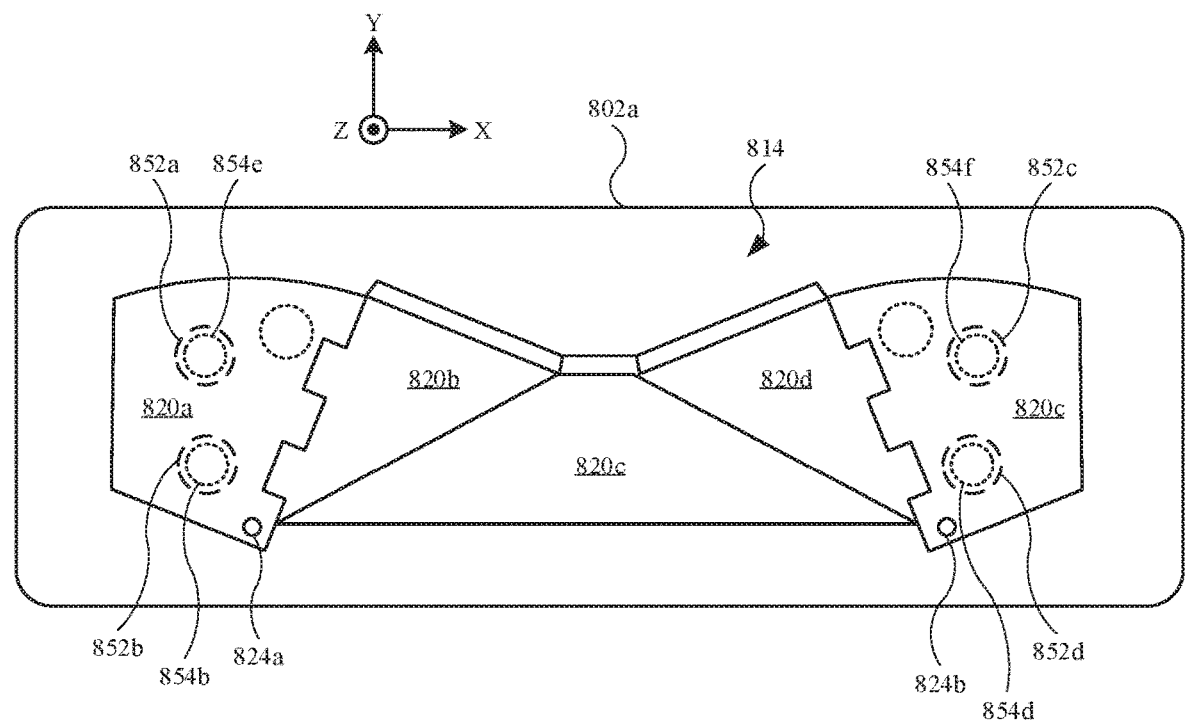
FIG. 23 illustrates a plan view of the hinge assembly shown in FIG. 22, showing an exemplary movement of the hinge assembly.

FIG. 23 illustrates a plan view of the hinge assembly 814 shown in FIG. 22, showing an exemplary movement of the hinge assembly 814. As shown, the hinge component 820a is rotated clockwise and the hinge component 820c is rotated counter-clockwise. However, the hinge component 820a and the hinge component 820c remain on, or along, the X-Y plane. Due to the rotation of the hinge component 820a, the hinge component 820b is rotated out of the X-Y plane and into a third dimension defined by the Z-axis. Also, due to the rotation of the hinge component 820c, the hinge component 820d is rotated out of the X-Y plane and into a third dimension defined by the Z-axis. The hinge component 820a and the hinge component 820b rotate about the fastener 824a, and the hinge component 820c and the hinge component 820d rotate about the fastener 824b. The rotation of the hinge component 820b and the hinge component 820d cause the hinge component 820e to also rotate out of the X-Y plane. Also, the magnet 852a in the hinge component 820a is magnetically coupled with the magnet 854e in the segment 802a. Also, the magnet 852c in the hinge component 820c is magnetically coupled with the magnet 854f in the segment 802a. The magnetic coupling between the magnets in the hinge components and the magnets in the segment 802a provide a magnetic attraction force to maintain the hinge assembly 814 in the deployed configuration (shown in FIG. 23), even when the hinge assembly 814 is supporting the weight of a portable electronic device (not shown in FIG. 23).

Figure 24:
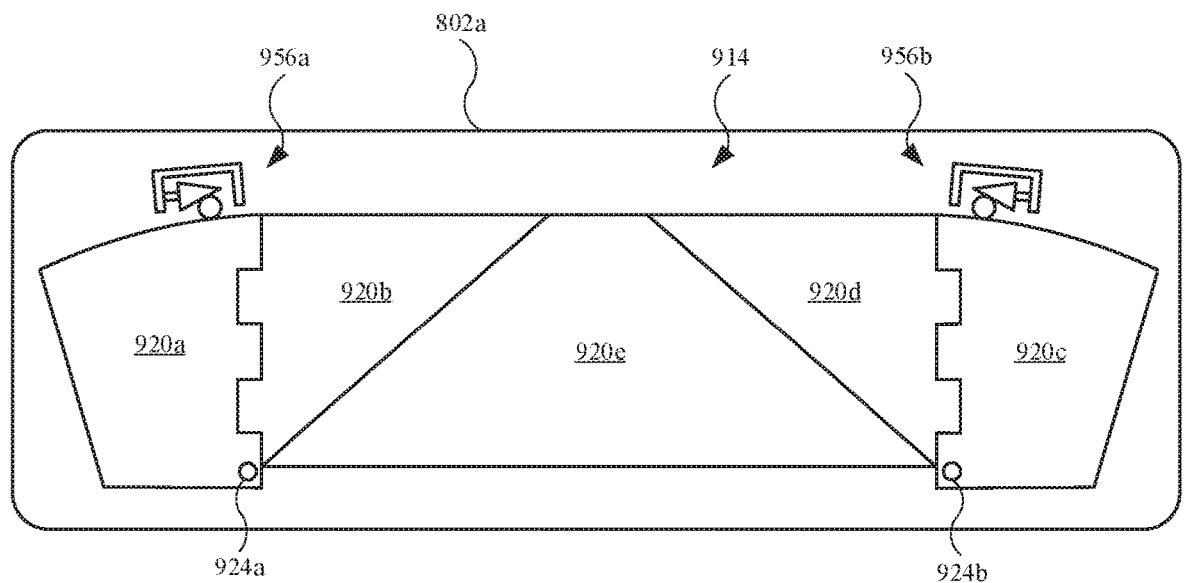
FIG. 24 illustrates a plan view of an alternate embodiment of a hinge assembly, in accordance with some described embodiments.

FIG. 24 illustrates a plan view of an alternate embodiment of a hinge assembly 914, in accordance with some described embodiments. The hinge assembly 914 may include features from other hinge assemblies described herein. As shown, the hinge assembly 914 is positioned over a segment 902a. As shown, the hinge assembly 914 includes a hinge component 920a coupled with a hinge component 920b by a joint that allows relative movement between the hinge component 920a and the hinge component 920b, and a hinge component 920c coupled with a hinge component 920d by a joint that allows relative movement between the hinge component 920c and the hinge component 920d. In order to secure the hinge component 920a and the hinge component 920b to a segment of an accessory device (not shown in FIG. 24), a fastener 924a may extend through an opening of the hinge component 920a. In order to secure the hinge component 920c and the hinge component 920d to a segment of an accessory device (not shown in FIG. 24), a fastener 924b may extend through an opening of the hinge component 920c. The fastener 924a can define a rotational axis for the hinge component 920a and the hinge component 920b, and the fastener 924b can define a rotational axis for the hinge component 920c and the hinge component 920d. The hinge assembly 914 may further include hinge component 920e. The hinge component 920e designed to receive a panel (not shown in FIG. 24) used to engage and retain a portable electronic device. The hinge component 920e may couple with the hinge component 920b and the hinge component 920d by flexible members (not shown in FIG. 24) that allow relative movement between the hinge component 920e and both the hinge component 920b and the hinge component 920d.

The segment 902a may include features that provide the hinge assembly 914 with an asymmetric force profile. For example, the segment 902a may include a roller assembly 956a that engages the hinge component 920a. As shown, the hinge assembly 914 is in a stored configuration. However, when the hinge assembly 914 transitions to a deployed configuration, the hinge component 920a rotates relative to the roller assembly 956a. Furthermore, the rotational movement of the hinge component 920a causes the roller assembly 956b to roll along a surface of the hinge component 920a. However, when the hinge assembly 914 transitions back to the stored configuration, the roller assembly 956a may slide along the surface of the hinge component 920a, rather than roll. When the roller assembly 956a provides frictional engagement via sliding, the movement of the hinge component 920a is impeded, as compared to the rolling action. In this regard, the force required to transition the hinge assembly 914 from the stored configuration to the deployed configuration is less than the force required to transition the hinge assembly 914 from the deployed configuration to the stored configuration.

Similarly, the segment 902a may include a roller assembly 956b that engages the hinge component 920c. As shown, the hinge assembly 914 is in a stored configuration. However, when the hinge assembly 914 transitions to a deployed configuration, the hinge component 920c rotates relative to the roller assembly 956b. Furthermore, the rotational movement of the hinge component 920c causes the roller assembly 956b to roll along a surface of the hinge component 920c. However, when the hinge assembly 914 transitions back to the stored configuration, the roller assembly 956b may slide along the surface of the hinge component 920c, rather than roll. When the roller assembly 956b provides frictional engagement via sliding, the movement of the hinge component 920c is impeded, as compared to the rolling action. In this regard, the force required to transition the hinge assembly 914 from the stored configuration to the deployed configuration is less than the force required to transition the hinge assembly 914 from the deployed configuration to the stored configuration.

Figure 25:
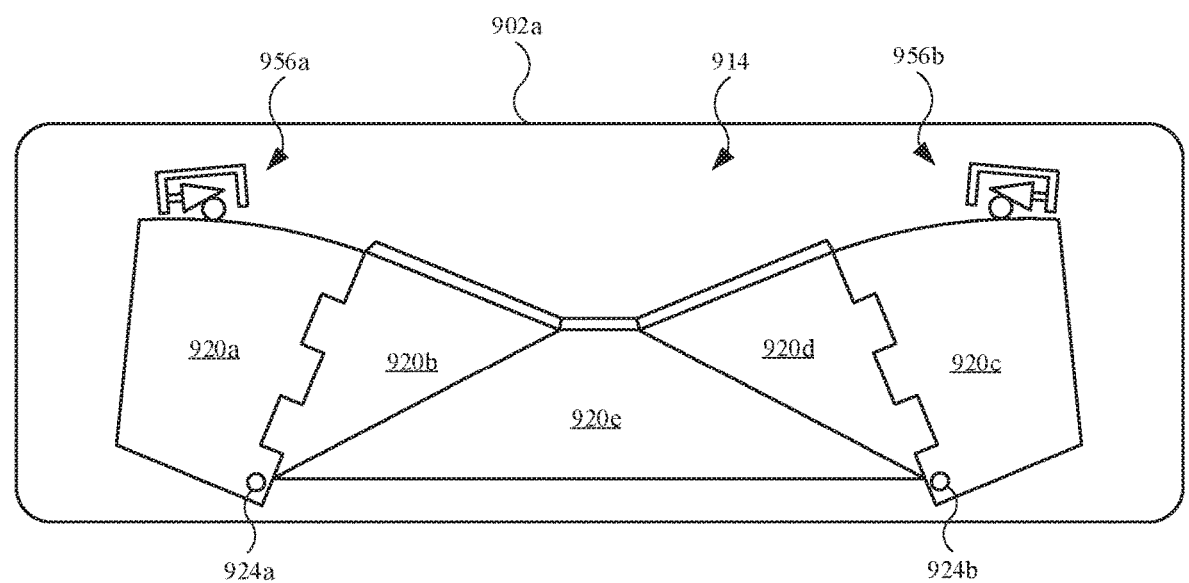
FIG. 25 illustrates a plan view of the hinge assembly shown in FIG. 24, showing an exemplary movement of the hinge assembly.

FIG. 25 illustrates a plan view of the hinge assembly 914 shown in FIG. 24, showing an exemplary movement of the hinge assembly 914. As shown, the hinge component 920a is rotated clockwise and the hinge component 920c is rotated counter-clockwise. However, the hinge component 920a and the hinge component 920c remain on, or along, the X-Y plane. Due to the rotation of the hinge component 920a, the hinge component 920b is rotated out of the X-Y plane and into a third dimension defined by the Z-axis. Also, due to the rotation of the hinge component 920c, the hinge component 920d is rotated out of the X-Y plane and into a third dimension defined by the Z-axis. The hinge component 920a and the hinge component 920b rotate about the fastener 924a, and the hinge component 920c and the hinge component 920d rotate about the fastener 924b. The rotation of the hinge component 920b and the hinge component 920d cause the hinge component 920e to also rotate out of the X-Y plane. Also, in the deployed configuration, the roller assembly 956a and the roller assembly 956b are located on different surface location of the hinge component 920a and the hinge component 920c, respectively, as compared to the stored configuration (shown in FIG. 24). Further, the roller assembly 956a and the roller assembly 956b provide a force to the hinge component 920a and the hinge component 920c, respectively, to maintain the hinge assembly 914 in the deployed configuration, even when the hinge assembly 914 is supporting the weight of a portable electronic device (not shown in FIG. 25). The roller assembly 956*a* and the roller assembly 956*b* provide the hinge assembly 914 with an asymmetric force profile, as the force required to transition the hinge assembly 914 from the stored configuration to the deployed configuration is less than the force required to transition the hinge assembly 914 from the deployed configuration to the stored configuration.

Figure 26:
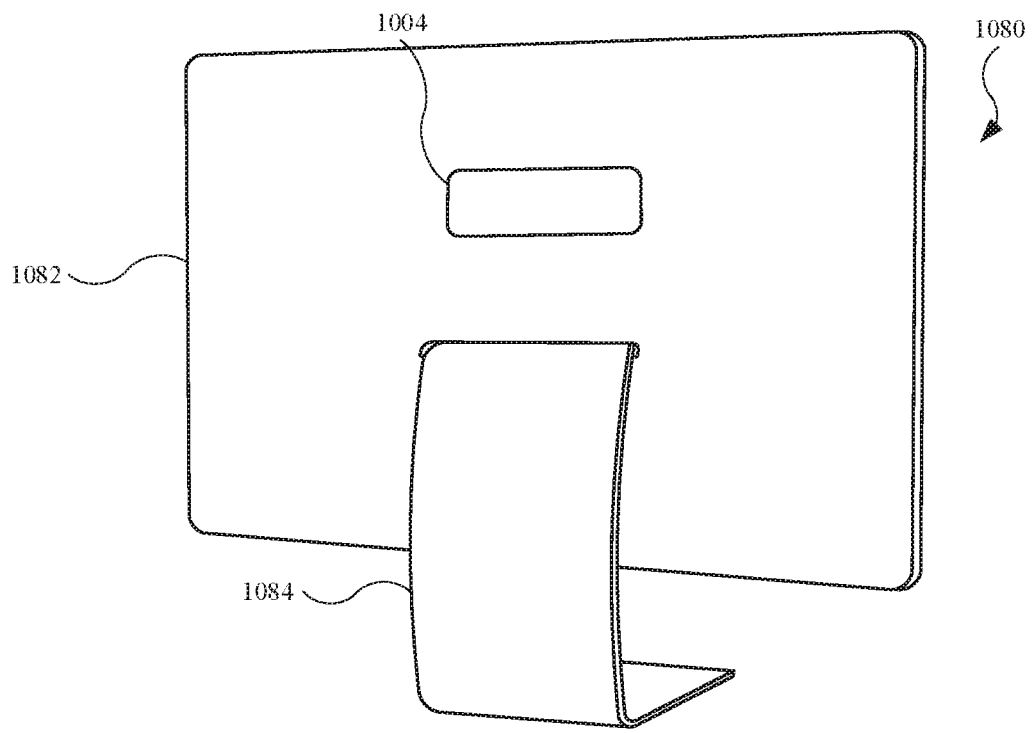
FIG. 26 illustrates an isometric view of an embodiment of an electronic device, showing a panel integrated into a housing of the electronic device, in accordance with some described embodiments.

FIG. 26 illustrates an isometric view of an embodiment of an electronic device 1080, showing a panel 1004 integrated into a housing 1082 of the electronic device 1080, in accordance with some described embodiments. The electronic device 1080 may include a desktop computing device with a display assembly and processing circuitry (not shown in FIG. 26) carried by the housing 1082. Also, the electronic device 1080 may include a stand 1084 coupled to the housing 1082.

Figure 27:
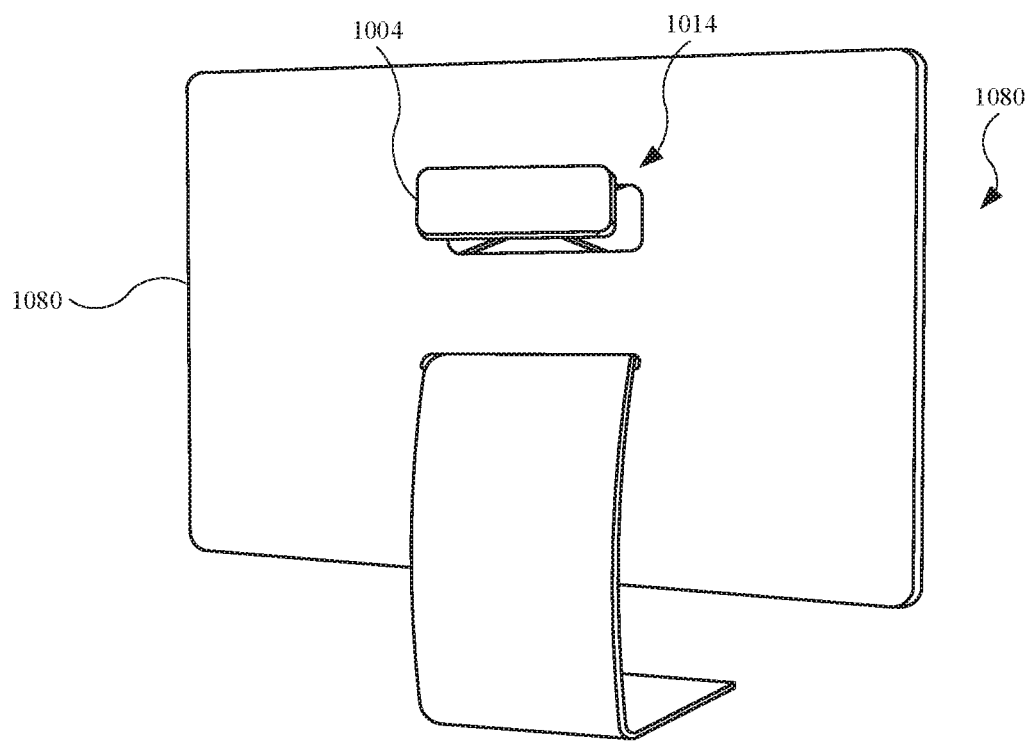
FIG. 27 illustrates an isometric view of the electronic device shown in FIG. 26, showing the panel extended from the housing.

FIG. 27 illustrates an isometric view of the electronic device 1080 shown in FIG. 26, showing the panel 1004 extended from the housing 1082. The panel 1004 may define a handle that can be grasped by a user to pick up and move the electronic device 1080. The panel 1004 is coupled to a hinge assembly 1014, which may include features from any hinge assembly described herein. Accordingly, the hinge assembly 1014 and the panel 1004 may transition from a stored configuration (shown in FIG. 26) to a deployed configuration (shown in FIG. 27).

Figure 28:
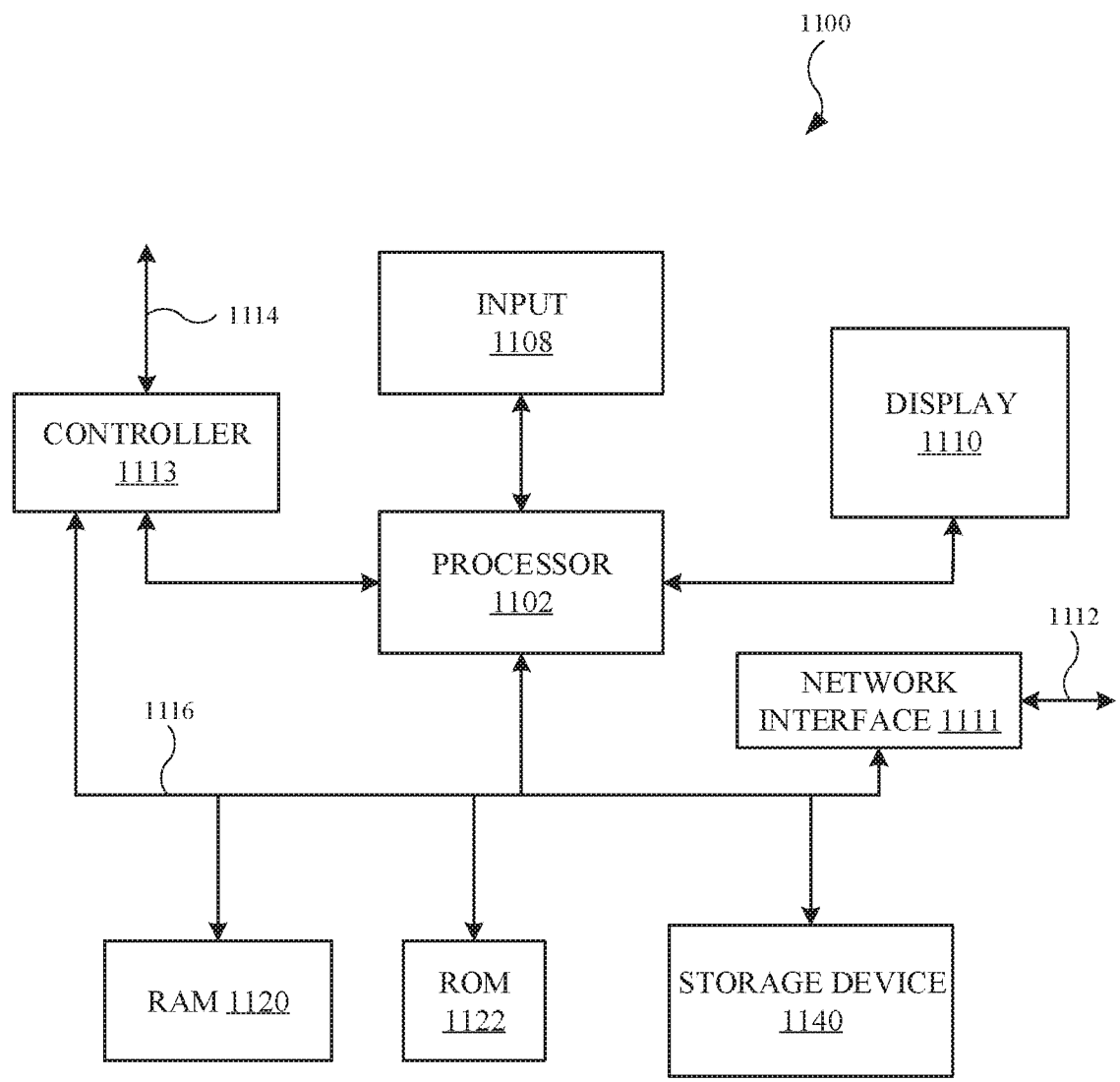
FIG. 28 illustrates a block diagram of an electronic device, in accordance with some described embodiments.

FIG. 28 illustrates a block diagram of an electronic device 1100, in accordance with some described embodiments. At least some components shown for the electronic device 1100 in the block diagram may be incorporated into accessory devices and electronic devices described herein.

As shown in FIG. 28, the electronic device 1100 can include a processor 1102 that represents a microprocessor or controller for controlling the overall operation of electronic device 1100. The electronic device 1100 can also include inputs 1108. Some of the inputs 1108 allow a user of the electronic device 1100 to interact with the electronic device 1100. For example, the inputs 1108 can take the form of a variety of user input devices, such as a button, a keypad, a dial, touch screen, audio input interface, visual/image capture input interface, input in the form of sensor data, etc. Still further, the electronic device 1100 can include a display 1110 (screen display) that can be controlled by the processor 1102 to present visual information to the user. A data bus 1116 can facilitate data transfer between at least a storage device 1140, the processor 1102, and a controller 1113. The controller 1113 can be used to interface with and control different equipment (not shown in FIG. 28) through an equipment control bus 1114. The electronic device 1100 can also include a network/bus interface 1111 that couples to a data link 1112. In the case of a wireless connection, the network/bus interface 1111 can include a wireless transceiver.

The electronic device 1100 also includes a storage device 1140, which may include a single disk or multiple disks (e.g., hard drives), and includes a storage management module that manages one or more partitions within the storage device 1140. In some embodiments, storage device 1140 can include flash memory, semiconductor (solid state) memory or the like. The electronic device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the electronic device 1100.

The electronic device 1100 also includes a storage device 1140, which may include a single disk or multiple disks (e.g., hard drives), and includes a storage management module that manages one or more partitions within the storage device 1140. In some embodiments, storage device 1140 can include flash memory, semiconductor (solid state) memory or the like. The electronic device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the electronic device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for a portable electronic device, the accessory device comprising:
    a segment comprising an opening that leads to an internal volume;
    a panel capable of receiving the portable electronic device; and
    a hinge assembly carried by the segment and coupled with the panel, the hinge assembly comprising:
        a first hinge component secured to the segment by a fastener, the first hinge component configured to rotate about a pivot point defined by the fastener, and
        a second hinge component configured to rotate about the pivot point,
    wherein:
        a first configuration comprises the first hinge component and the second hinge component positioned in the internal volume and covered by the panel, and
        a second configuration comprises the second hinge component positioned at least partially out of the internal volume.

2. The accessory device of claim 1, wherein:
the first configuration comprises the first hinge component and the second hinge component located in the internal volume, and
the second configuration comprises the first hinge component remaining in the internal volume and the second hinge component positioned at least partially out of the internal volume.

3. The accessory device of claim 2, wherein the first hinge component remains parallel with respect to the segment in the first configuration and the second configuration.

4. The accessory device of claim 1, wherein the hinge assembly comprises:
a platform coupled with the second hinge component;
a third hinge component configured to rotate about a second pivot point; and
a fourth hinge component coupled with the third hinge component and the platform, the fourth hinge component configured to rotate about the second pivot point.

5. The accessory device of claim 1, wherein the panel comprises magnets configured to magnetically couple with magnets in the portable electronic device.

6. The accessory device of claim 1, wherein the segment comprises a surface that surrounds the opening, and wherein the first configuration comprises the panel being co-planar with respect to the surface.

7. An accessory device for a portable electronic device, the accessory device comprising:
a first segment comprising a keyboard capable of communicating with the portable electronic device;
a second segment coupled with the first segment;
a panel that defines a receiving surface for the portable electronic device; and
a hinge assembly secured with the second segment and the panel, the hinge assembly comprising:
a first hinge component, and
a second hinge component coupled to the first hinge component, the first hinge component and the second hinge component configured to rotate about a pivot point, wherein a rotation about the pivot point comprises i) the first hinge component rotating along a surface that is parallel to the second segment, and ii) the second hinge component rotating away from the surface and positioning the panel to receive the portable electronic device at the receiving surface.

8. The accessory device of claim 7, wherein during the rotation the first hinge component rotates simultaneously with the second hinge component.

9. The accessory device of claim 7, wherein:
the second segment defines an internal volume,
the second hinge component is co-planar with respect to the first hinge component prior to the rotation, and
the second hinge component is at least partially out of the internal volume subsequent to the rotation.

10. The accessory device of claim 9, wherein the first hinge component remains in the internal volume subsequent to the rotation.

11. The accessory device of claim 7, wherein when the panel receives the portable electronic device such that the portable electronic device lacks contact with the second segment and the first segment.

12. The accessory device of claim 11, wherein when the panel and the hinge assembly position the portable electronic device over the keyboard.

13. The accessory device of claim 7, wherein the panel comprises magnets capable of magnetically coupling with the hinge assembly when the panel covers the hinge assembly.

14. An accessory device for a portable electronic device, the accessory device comprising:
a segment comprising an opening that leads to an internal volume;
a panel comprising magnets capable of coupling with portable electronic device magnets of the portable electronic device; and
a hinge assembly that rotationally couples the panel with the segment, the hinge assembly comprising:
a first hinge component, and
a second hinge component rotationally coupled to the first hinge component, wherein the magnets magnetically couple with the second hinge component when the panel is in the opening,
wherein:
in a stored configuration, the panel is positioned in the opening and the hinge assembly is positioned in the segment and covered by the panel and,
in a deployed configuration, the hinge assembly is at least partially out of the segment and positions the panel such that the panel is capable of receiving the portable electronic device.

15. The accessory device of claim 14, wherein the segment comprises a surface that surrounds the opening, and wherein the panel is co-planar with respect to the surface when the panel is positioned in the opening.

16. The accessory device of claim 14, wherein the first hinge component and the second hinge component are configured to rotate about a pivot point.

17. The accessory device of claim 14, further comprising:
a fastener positioned in an opening of the first hinge component; and
a friction element positioned between the fastener and the first hinge component, wherein the fastener is rotationally driven to adjust an amount of friction provided to the first hinge component.

18. The accessory device of claim 14, wherein movement of the first hinge component and the second hinge components comprises the first hinge component being parallel to the segment and the second hinge component being non-parallel to the segment.

19. The accessory device of claim 2, wherein the second configuration further comprises the first hinge component and the fastener remaining fully within the internal volume.

20. The accessory device of claim 2, wherein the panel includes a size and shape capable of fully covering the opening.

* * * * *

UNITED STATES PATENT AND TRADEMARK OFFICE
CERTIFICATE OF CORRECTION

Page 1 of 1

PATENT NO. : 10,705,574 B2
APPLICATION NO. : 16/290655
DATED : July 7, 2020
INVENTOR(S) : Robinson et al.

It is certified that error appears in the above-identified patent and that said Letters Patent is hereby corrected as shown below:

In the Claims

In Claim 3, at Column 23, Line 9: "The accessory device of claim 2," should read -- The accessory device of claim 1, --.

In Claim 19, at Column 24, Line 52: "The accessory device of claim 2," should read -- The accessory device of claim 1, --.

In Claim 20, at Column 24, Line 55: "The accessory device of claim 2," should read -- The accessory device of claim 1, --.

Signed and Sealed this
Tenth Day of November, 2020

Andrei Iancu
*Director of the United States Patent and Trademark Office*